United States Patent
Musgrove et al.

(10) Patent No.: US 8,271,351 B2
(45) Date of Patent: Sep. 18, 2012

(54) SYSTEM AND METHOD FOR GENERATING AN ALTERNATIVE PRODUCT RECOMMENDATION

(75) Inventors: Timothy A. Musgrove, Morgan Hill, CA (US); Robin Hiroko Walsh, San Francisco, CA (US)

(73) Assignee: CBS Interactive Inc., San Francisco, CA (US)

( * ) Notice: Subject to any disclaimer, the term of this patent is extended or adjusted under 35 U.S.C. 154(b) by 114 days.

(21) Appl. No.: 12/827,170

(22) Filed: Jun. 30, 2010

(65) Prior Publication Data

US 2010/0268598 A1  Oct. 21, 2010

Related U.S. Application Data

(60) Division of application No. 10/839,700, filed on May 6, 2004, now Pat. No. 7,783,528, and a continuation-in-part of application No. 10/430,679, filed on May 7, 2003, now Pat. No. 7,840,448.

(51) Int. Cl.
*G06Q 30/00* (2012.01)
(52) U.S. Cl. .................................................. 705/26.7
(58) Field of Classification Search ............... 705/26.1, 705/26.7
See application file for complete search history.

(56) References Cited

U.S. PATENT DOCUMENTS

| | | | |
|---|---|---|---|
| 6,034,652 A | 3/2000 | Freiberger et al. | |
| 6,263,507 B1 | 7/2001 | Ahmad et al. | |
| 6,757,682 B1 | 6/2004 | Naimark et al. | |
| 6,788,314 B1 | 9/2004 | Freiberger et al. | |
| 7,418,447 B2 * | 8/2008 | Caldwell et al. | 705/26.1 |
| 7,530,018 B2 * | 5/2009 | Bischoff | 715/255 |
| 2001/0032077 A1 * | 10/2001 | Tavor | 704/257 |
| 2003/0105682 A1 * | 6/2003 | Dicker et al. | 705/27 |

OTHER PUBLICATIONS

Chai, Joyce et al., "Natural Language Assistant: A Dialog System for Online Product Recommendation," AI Magazine, La Canada, Summer 2002, vol. 23, iss. 2, p. 63.*

* cited by examiner

*Primary Examiner* — Amee A Shah
(74) *Attorney, Agent, or Firm* — Marc S. Kaufman; Gerard M. Donovan; Reed Smith LLP

(57) ABSTRACT

A method and system for automatically generating a naturally reading narrative product summary including assertions about a selected product. In one embodiment, the method includes the steps of determining at least one attribute associated with the selected product, selecting an alternative product, retrieving assertion models to describe the product and to recommend an alternative product in a natural manner, and generating a naturally reading narrative by combining the attribute and the selected alternative product with the retrieved assertion models such that the generated narrative includes a recommendation of the selected alternative product. A system is provided for implementing the described method.

52 Claims, 6 Drawing Sheets

/ 110

PRODUCT SUMMARY

Intro: The Canon PowerShot A200 is a 2.0 megapixel, general-purpose digital camera. Relative to other general-purpose cameras on the market, it is very low-priced at around $187.00.

Noteworthy Features: Has a 1/2000 sec maximum shutter speed, which is faster than some similarly priced cameras. (In fact, the average cost of a product with this fast a maximum shutter speed is $445).

Weaker Features: Has no optical zoom, which is somewhat less desirable than some similarly priced cameras. (For example, the Fujifilm FinePix 2650, a 2.0 megapixel camera at around $184, has a 3 x optical zoom).

Suitability: Built for the average, casual picture-taker. A recommended use (based on key features) is photo album photography . The largest size prints recommended (estimated from the camera's image resolution) are 4"x6" prints.

Value: Overall, this camera's features are in line with it's price point. However, if you were to judge strictly by the resolution, you would see that the average price of general-purpose cameras with comparable resolution is considerably more, in fact, around $227.

On storing pictures: Using the included 8 MB memory, and with high-quality jpeg settings at the camera's full resolution, you will be able to store around 8 pictures. We suggest that you get at least a 64 MB CompactFlash card to go along with this camera, which will let you store around 64 pictures.

Alternative Product Recommendation: Before deciding on buying this Canon camera, check out Sony Cybershot DSC-P32 which provides higher resolution for about the same price.

Figure 2B

SYSTEM AND METHOD FOR GENERATING AN ALTERNATIVE PRODUCT RECOMMENDATION

This application is a divisional of application Ser. No. 10/839,700 filed on May 6, 2004 entitled "SYSTEM AND METHOD FOR GENERATING AN ALTERNATIVE PRODUCT RECOMMENDATION", which is a continuation-in-part of application Ser. No. 10/430,679, filed May 7, 2003, the contents of which are incorporated herein by reference.

BACKGROUND OF THE INVENTION

1. Field of the Invention

The present invention is directed to systems and methods for generating product summaries. In particular, the present invention is directed to such systems and methods that allow automatic generation of product summaries together with alternative product recommendations that read naturally.

2. Description of Related Art

Many different models of products from many different manufacturers are generally available for each type or category of product. Typically, manufacturers of a particular category of product offer various models in their product line, each model targeting a particular group of users and/or meeting the specific needs of a market segment. For instance, manufacturers of automobiles, vacuum cleaners, cameras, computers, etc. all generally manufacture a variety of models of their products. In many instances, each model from each manufacturer and models from differing manufacturers have different features and/or attributes associated with the particular category of product.

For example, in the product category of vacuum cleaners, various models having different combinations of features and/or attributes are presently available. These features and/or attributes for vacuum cleaners include bag/bagless operation, motor power, attachments, exhaust filtration, price, etc. One particular model of a vacuum cleaner may have a bag to collect debris, a 6 ampere motor, without attachments or exhaust filtration, and be typically sold in the marketplace for $60 U.S. Another particular model of a vacuum cleaner may have a bagless compartment to collect debris, an 8 ampere motor, provided with attachments and a HEPA filtration, and be typically sold in the marketplace for $160 U.S. Of course, many other features and attributes may distinguish each of the vacuum cleaners that are available.

In another example, for the product category of digital cameras, features and/or attributes include optical and digital zoom capability, pixel count, the presence, type and size of a view screen, flash capacity, memory capacity, price, etc. One particular model of digital camera may have a 2× optical zoom, 2.1 megapixels, a flash, a 2 inch color view screen, a 32 Mb memory, and be typically sold in the market place for $200 U.S. Another particular model of digital camera may have a 3× digital zoom, 4 megapixels, a flash, a 3 inch color view screen, a 64 Mb memory and be typically sold in the market place for $ 400 U.S. Of course, many other features and attributes may distinguish each of the digital cameras that are available in the digital camera product category.

Moreover, the identity of the manufacturer of a particular product also impacts the desirability of the product. Generally, a product from a well known and respected manufacturer is more desirable to a consumer than a product from a lesser known manufacturer. Various manufacturers have, over time, become recognized as being market leaders with respect to particular category of products. For example, in the above noted vacuum cleaner product category, HOOVER™, EUREKA™ and DIRT DEVIL™ are examples of vacuum cleaner manufacturers considered to be market leaders. In the above noted product category of digital cameras, CANON™ and SONY™ are considered to be the market leaders. Each of the manufacturers generally provide various models with differing levels of features and performance that are targeted to specific consumer groups with particular use in mind.

The vast number of manufacturers and models available for each product category, and the disparity in features and/or attributes between the products of a product category can make a consumer's purchasing decision very difficult. Companies such as CNET™ Networks, Inc. (hereinafter "CNET") which operates www.cnet.com provide information regarding consumer and technology oriented products such as electronics and computer products for buyers, sellers, and suppliers of technology, as well as any other interested user.

In addition to providing raw data and information, many different products in a particular product category are evaluated by editors of CNET for various features and/or attributes and rated on a scale of 1 through 10. Products that are evaluated to have higher quality and to provide superior value to consumers are rated higher than products of lesser quality and value. Moreover, the editors often provide written narrative product summaries that highlight various features of the particular product, and discuss strengths and weaknesses of the reviewed product in comparison to other comparable products.

The information and narrative product summaries provided by CNET and others regarding various products in a product category may be used by consumers to facilitate potential purchase decisions. However, the process of rating the numerous products is time and labor intensive requiring trained editors or other personnel familiar with features and/or attributes of a product category to evaluate each of the products. Moreover, providing written narrative product summaries that highlight various features of the product, and discuss strengths and weaknesses of the reviewed product in comparison to other comparable products requires even more effort from the editors. Such written narrative product summaries requires significant time and resources of the editor, thereby correspondingly requiring significant capital expense to provide such written narrative product summaries by the editor.

Various automated systems have been developed to eliminate or substantially reduce the requirement for individual evaluation of each product. For instance, U.S. Pat. No. 5,731,991 to Kinra et al. discloses a system for evaluating a software product including an interface that receives product data relating to the software product, a first memory that stores the product data, and a second memory that stores a plurality of weighting values. The system also includes a processor that is coupled to the first memory and the second memory which applies the plurality of weighting values to the product data to generate at least one criterion score for the software product, each criterion score representing an evaluation of the software product.

U.S. Pat. No. 6,236,990 to Geller et al. discloses a system and method for assisting a user in selecting a product from multiple products that are grouped into categories. The reference discloses that information such as attributes about the products of each category, and questions related to the attributes, are received and stored. In addition, possible user's responses to the questions and weights associated with each possible response are also received and stored. Evaluation ratings for each of the attributes of each of the products are also received and stored. The reference discloses that the user selects a category and is provided with questions corresponding to the attributes of the products in the category selected. For each product in the category, a product score is calculated by summing the product of the weights of the responses by the evaluation ratings for that product. The results are displayed organized in rows and columns in the order of the product scores and weights. The reference further discloses that the user may change the weights, change categories, or obtain additional information about each product. In addition, the reference further discloses that the system allows attribution of the evaluation ratings, and may place an order for some or all products. However, the systems and methods of the above noted references merely provide ratings of plurality of products and do not provide systems and methods for generating narrative product summaries.

Other product review systems include systems that tally user votes on products, measure popularity of products by hits on a web page or by sales, or use collaborative filtering to measure which other products are commonly bought or also read about by customers who bought or read about a certain product. These product review systems invariably output numerical or discrete metrics such as by giving a product "three stars out of five" and do not provide any advice-bearing text summaries. Many e-commerce sites such as www.amazon.com, and others employ such systems.

Other advice-text generating systems such as that used by THE MOTLEY FOOL™ in the website www.fool.com generate evaluative text comments on stocks, takes into consideration dynamically updated data, and also produce real sentences. However, such systems evaluate and comment on all, and only on the same attributes of each product, regardless of the specific attributes of each item itself. Thus, these systems evaluate specific attributes of each product based on simple numerical threshold methods such as whether a quantitative value is above or below a certain point. In addition, such systems generate the same canned sentences for each item that falls below or above each threshold, so that the resultant sentences sound artificial and fabricated rather than product summaries that read naturally.

Thus, such product review systems provide reviews that are not in easily readable form that sound natural. Correspondingly, the conventional systems and methods also fail to provide automatically generated product summaries that sound and read naturally to aid consumers in making purchase decisions. In addition, when a consumer researches a particular product using presently available on-line tools and resources, only information regarding the particular product being researched is provided. Although the consumer may desire to research and identify an alternative product similar to the particular product being researched, tools for facilitating identification of such alternative products are generally not available. For example, to obtain information regarding an alternative product in vendor websites, the consumer is typically required to display a listing of all of the products in a particular category, and to select an alternative product to thereby display detailed information regarding the selected product. However, this selection is done by the consumer without information as to whether the newly selected alternative product is comparable to the researched product.

Some vendor websites such as www.bestbuy.com provide a boxed window that may be entitled "Also Consider" or the like which identifies an alternative product for the consumer's consideration in a page displaying detailed information regarding a product that was selected by the consumer. The identified alternative product is implemented as a link which may be selected by the consumer to obtain detailed information regarding the alternative product. However, the boxed window is implemented to merely identify products offered by the same manufacturer of the originally selected product, and identifies products having nearly identical specification that may only differ nominally, for example, color of the trim, or to a product from the same manufacturer having increased capacity of a particular feature, for example, memory capacity. To obtain corresponding information regarding the alternative product, the provided link must be selected by the consumer, upon which detailed information regarding the original product researched is removed and detailed information regarding the new selected alternative product is displayed.

Further, some vendor web sites such as www.bestbuy.com noted above, allow the consumer to check a "Compare" box for two or more products in a listing of products, and to display product features of the selected products in a side-by-side manner thereby allowing the products selected to be compared with respect to various product specifications and features. However, the products compared are selected by the consumer and are not provided as alternative suggestions by vendor web sites. Thus, the compared products may be tailored for totally different target markets which are generally not comparable with respect to each other. In addition, the comparative information provided is displayed as a tabulated listing which is not easy to comprehend.

Therefore, there exists an unfulfilled need for systems and methods for automatically generating narrative product summaries that sound and read naturally. In addition, there also exists an unfulfilled need for systems and methods for automatically generating narrative product summaries that are specifically tailored to the attributes discussed, and to the qualifications regarding the attributes. Furthermore, there also exists an unfulfilled need for systems and methods that automatically generate an alternative product recommendation. Moreover, there exists an unfulfilled need for such a system and method that provides such alternative product recommendation in a narrative that sound and read naturally.

SUMMARY OF THE INVENTION

In accordance with one aspect of the present invention, methods of automatically generating a naturally reading narrative product summary including assertions about a selected product are provided. In one embodiment, the method includes the steps of determining at least one attribute associated with the selected product, the attribute including an attribute name, an attribute value, and/or an attribute unit, selecting a comparable product, retrieving assertion models defining forms in which assertions can be manifested to describe the selected product and the selected alternative product in a natural manner, and generating a naturally reading narrative by combining the attribute with a retrieved assertion model and combining the selected comparable product with another retrieved assertion model to recommend the selected comparable product in the narrative.

In another embodiment, the method includes the steps of determining at least one attribute associated with the selected product, the attribute including an attribute name, an attribute value, and/or an attribute unit, selecting an alternative product, retrieving assertion models defining forms in which an assertion can be manifested to describe the product and to recommend an alternative product in a natural manner, and generating a naturally reading narrative by combining the at least one attribute and the selected alternative product with the retrieved assertion models such that the generated narrative includes a recommendation of the selected alternative product.

In accordance with another aspect of the present invention, a product summary generator for automatically generating a naturally reading narrative product summary including assertions about a selected product is provided. In accordance with one embodiment, the product summary generator includes a product attribute module adapted to determine at least one attribute associated with the selected product, the attribute including at least one of an attribute name, an attribute value, and/or an attribute unit and further adapted to select a comparable product, an assertion model module adapted to retrieve assertion models that define forms in which assertions can be manifested to describe the selected product and the selected comparable product in a natural manner, and a summary generation module adapted to combine the attribute with a retrieved assertion model to describe the selected product in the narrative and to combine the comparable product with another retrieved assertion model to recommend the selected comparable product in the narrative.

In accordance with another embodiment, the product summary generator includes a product attribute module adapted to determine at least one attribute associated with the selected product, the attribute including at least one of an attribute name, an attribute value, and/or an attribute unit, an alternative product selection module adapted to select an alternative product, an assertion model module adapted to retrieve assertion models that define forms in which an assertion can be manifested to describe the selected product and to recommend the selected alternative product, in a natural manner, and a summary generation module adapted to generate a naturally reading narrative by combining the attribute and the selected alternative product with the retrieved assertion models so that the narrative includes a recommendation of the selected alternative product.

In accordance with another aspect of the present invention, a method of automatically generating a naturally reading narrative product summary including assertions about a selected product is provided. In one embodiment, the method includes the steps of determining at least one attribute associated with the selected product, the at least one attribute including at least one of an attribute name, an attribute value, and an attribute unit, retrieving assertion models defining forms in which an assertion can be manifested to describe the selected product, and to recommend an alternative product in a natural manner, receiving a plurality of bids from manufacturers that indicate an amount of compensation each manufacturer is willing to pay to have at least one of the manufacturer's product to be recommended as the alternative product, selecting the alternative product based on the plurality of bids, and generating a naturally reading narrative by combining the at least one attribute and the selected alternative product with the retrieved assertion models such that the generated narrative includes a recommendation of the selected alternative product.

In the above regard, in another embodiment, the manufacturer may bid to be the only manufacturer, or one of a few manufacturers, whose products are included in a limited sub-pool of alternative products which are eligible for selection for recommendation. The best and most favorable alternative product in the sub-pool would then be selected for recommendation. If more than one manufacturer is represented with products in the limited sub-pool for the same category of products, an optional weighting factor based on the highest bid may be provided so that the products from the highest bidder may be selected. Of course, the selection of the alternative product may be based on other business consideration, for example, if a revenue model other than bidding is utilized for payment.

These and other advantages and features of the present invention will become more apparent from the following detailed description of the preferred embodiments of the present invention when viewed in conjunction with the accompanying drawings.

BRIEF DESCRIPTION OF THE DRAWINGS

FIG. 2B is the product summary of FIG. 2A which has been instantiated to provide a product summary that reads naturally.

GLOSSARY OF TERMS

Figure 1:
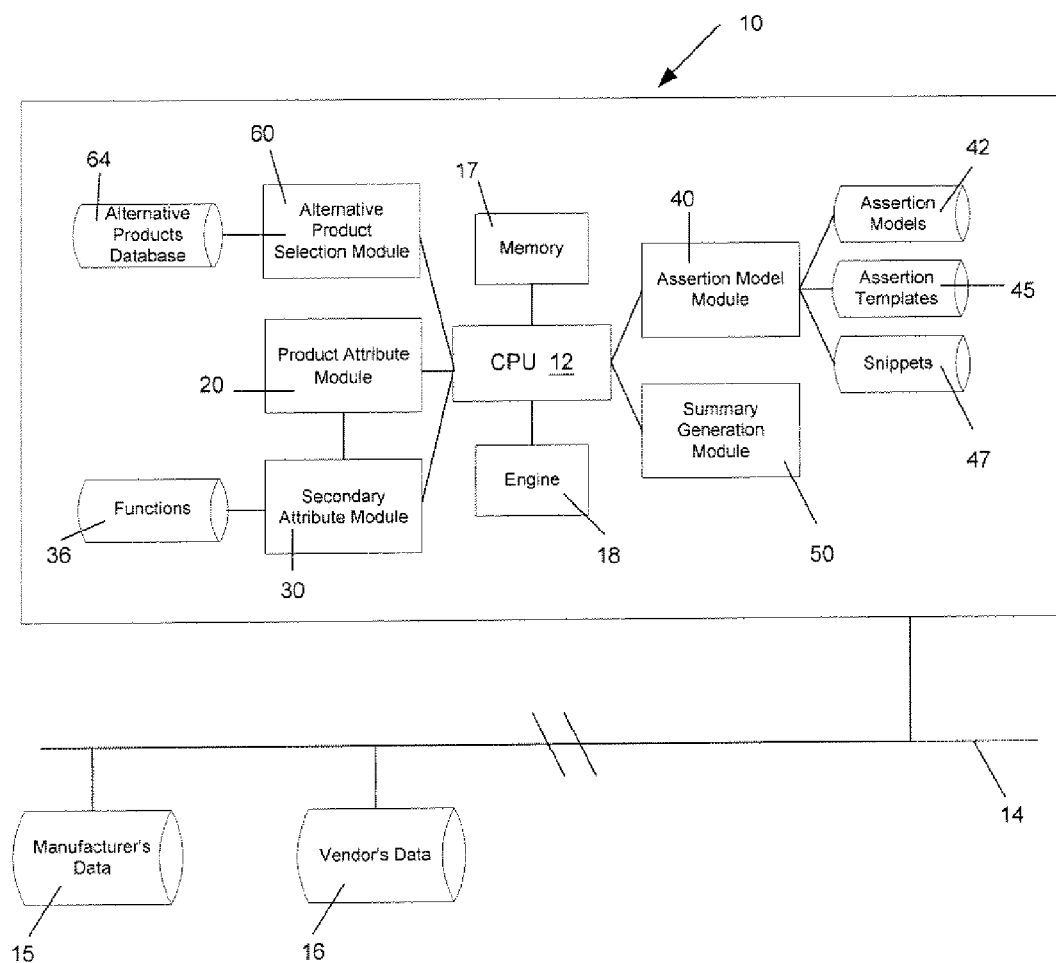
FIG. 1 is a schematic illustration of a product review generator in accordance with one example embodiment of the present invention.

Additive rule: a rule for composing a secondary attribute which indicates that if the primary attribute is instantiated more than once, then the values will be concatenated. See also: secondary attribute, override rule and optimizing rule.

Assertion model: a set of assertion templates which define various forms in which an assertion can manifest itself as a sentence.

Assertion template: One of several grammatical patterns, together with additional field names such as the key attribute for the template, an optional excluded feature, and an optional requisite feature. The sentence pattern can be a list of "snippets." See also: snippet, assertion, key attribute, excluded feature, requisite feature.

Assertion: a point or premise of information, fact, or opinion being made by any number of possible sentences or fragments which express that point; the common state-of-affairs depicted by possible variants of an assertion.

Attribute name-value pair: A matched attribute name and attribute value, also called a feature. E.g. "3-megapixel resolution." May also include the units of the attribute name.

Attribute: any defined attribute of a product or product category, whether intrinsic or extrinsic, whether primary or secondary, is considered an attribute.

Connotation: Within an assertion template, an internal flag indicating whether the tone of the sentence is positive, negative, or neutral. This flag is set internally to match the connotation of the value of the key attribute of the assertion template. It is then used to determine whether a continuous transition or contrasting transition is needed when placing the sentence into a paragraph.

Excluded feature: In a secondary attribute composition rule, or in an assertion template, the attribute name-value pair which, if present in the product, should cause the building of the attribute or assertion to fail.

Extrinsic attribute: an attribute which is not inherently a part of the product but is dependent on external factors such as the marketplace, human judgment about the product, human purposes satisfied by the product, etc.

Feature: an attribute name-value-unit combination. For example, "resolution" is an attribute name, "3 megapixel" is a value-unit pair, and "3 megapixel resolution" is a feature.

Field name: any field name of an attribute, vocabulary, product, or assertion. Numerous field names can be referenced in the input files accepted by the product summary generator.

Importance rating: a rating of how important an attribute is within a product category. For example, a scale of 1-10 can be used. These ratings can be modified by a usage scenario.

Intrinsic attribute: an attribute not dependent on comparison with things or events outside the product itself. See also: extrinsic attribute.

Key attribute: Attribute that is very important to a particular product category and at least partially defines performance or desirability of a product in the product category. The key attribute of a category is used in special ways, such as to give context to a product in introductory remarks, for example, calling a camera a "3-megapixel camera". Each assertion template within an assertion model has its own key attribute. Within an assertion template, any references to applicable field names are taken to refer to this key attribute.

Optimizing rule: a rule for building a secondary attribute which means that if the primary attribute is instantiated more than once, then the new value will be an override if, and only if, the previously instantiated value is non-optimal; otherwise the old value can be retained. If more than one optimal value is instantiated, they can be additive with respect to each other. If at least one optimal value is instantiated, non-optimal values are over-written and no further non-optimal values will be admitted. Implies that results fields for secondary attribute composition rule contain some result value(s) marked with an appended asterisk (*) to indicate that they are optimal, while other values are not. See also secondary attribute, override rule and additive rule.

Ordinality: indication of in what order assertions should be placed within the same thematic paragraph. Assertions which are tied in their ordinality, are randomly ordered with respect to one another.

Override rule: a rule for building a secondary attribute which means that if there are successive redundant functions for defining a secondary attribute, each instance will override the previous one. It should be rare that an editor would have redundant override rules, however. Normally, when defining multiple rules for building the same attribute, one would set this flag to either additive or optimizing.

Primary attribute: An attribute that is inputted to the system, deriving either from our spec table, price feed, or product record. Distinguished from secondary attributes, which are created dynamically by the system.

Primary scenario: the usage scenario which is selected as the default assignment for a particular product. E.g. a camera best suited for professional photography.

Product summary: a body of text intended to concisely state several insights or observations about a particular product. See also: theme, assertion.

Property: a primary intrinsic attribute. In other words, an attribute not dependent on any contextual elements outside the product itself, therefore independent of the market, and independent of human judgment and use-case scenarios. See also: attribute, intrinsic attribute, primary attribute.

Resident functions: the built-in functions for building secondary attributes. The most commonly used examples are: sum, product, quotient, absolute value, positive threshold, negative threshold, sub-string, and test.

Required feature: a feature that is required for triggering of a secondary attribute rule or an assertion-to-sentence transformation.

Scalarization: the ordering of values within a value range of an attribute so as to form an evaluative scale, e.g. ordering batteries from more favorable to less favorable in the order of Lithium, NiMH, NiCad, Alkaline. The scalarization is done according to an evaluative metric—meaning the question of which aspect, element, or quality of the attribute was chosen for the scalarization. For example, batteries were ordered above probably according to their charge-life and lack of "memory," but if they were to be ordered according to ease-of-availability and/or being least-expensive, the scalarization would be different because a different evaluative metric had been adopted.

Scenario: see usage scenario.

Scenario glosses: phrases established for each scenario to describe the activities, settings and environments, etc. pertaining to each usage scenario.

Secondary attribute: an attribute that is formed by applying a function to one or more pre-existing attributes. Distinguished from primary attributes, which are inputted from a file and derived from a function. Both primary and secondary attributes may be referenced in the rule for forming a secondary attribute. A collection of resident functions is support by the product summary generator for creating secondary attributes.

Sentence: A complete, grammatical sentence formed by the generator. Every sentence is also called a variant of its assertion model.

Severity value: A value expressing how seriously good, or seriously bad it is for a product to have a certain attribute value. A very low or a very high severity is indicative of an attribute of the product that is strong interest to most consumers.

Snippet: a single element of an assertion template representing a sentence fragment, and including free-form text, word replacement sets, and/or field name. See also: assertion template, word replacement set, field name.

Theme: The concept which unifies multiple assertions together. See also: assertion.

Units: the unit-of-measure for an attribute, e.g. megapixels.

Usage scenario: An alternative set of importance ratings and scalarizations reflecting a different purpose, point-of-view, or intended usage of a type of product. Usage scenarios are inheritable according to the taxonomical structure of product categories, and they are additive so that they can be combined.

Variant: a fully-formed sentence that is derived from an assertion model. After an assertion template is selected and word-replacements and value look-ups are performed, the resulting, complete sentence is a "variant" of the assertion template. See also: assertion, assertion model, assertion template.

Word replacement set: The simpler way of varying phraseology on a small scale within an assertion model, whereby simple lists of alternative, fully-interchangeable words are indicated as choices. See also: assertion, assertion model, assertion template.

DETAILED DESCRIPTION OF THE PREFERRED EMBODIMENT

FIG. 1 is a schematic illustration of a product summary generator 10 for generating narrative product summaries in accordance with one embodiment of the present invention. It will be evident from the discussion below that the preferred embodiment of the present invention provides a product summary generator which generates product summaries that sound and read naturally so that it can be easily understood by the reader and information presented therein can be used to aid in purchasing decisions. In addition, it will also be evident that the present invention may also be utilized to provide a recommendation for an alternative product.

For clarity purposes, the present invention is also described below as applied to generating a narrative product summary with an alternative product recommendation for digital cameras. However, it should be evident that the present invention may be readily used to generate product summaries with alternative product recommendations for any products of any product category, and application to digital cameras is merely provided as one example. Moreover, various terminologies are utilized to describe the preferred embodiment of the present invention, definitions of various terms are provided in the GLOSSARY OF TERMS section set forth above to facilitate complete comprehension of the preferred embodiment.

In accordance with the illustrated embodiment of the present invention, the product summary generator 10 is provided with a central processing unit 12 (hereinafter "CPU") which is adapted to control and/or facilitate functions of various modules of the product summary generator 10 as described in detail below. It should be initially noted that the product summary generator 10 of FIG. 1 may be implemented with any type of hardware and software, and may be a pre-programmed general purpose computing device. For example, the product summary generator 10 may be implemented using a server, a personal computer, a portable computer, a thin client, a hand held device, a wireless phone, or any combination of such devices. The product summary generator 10 may be a single device at a single location or multiple devices at a single, or multiple, locations that are connected together using any appropriate communication protocols over any communication medium such as electric cable, fiber optic cable, any other cable, or in a wireless manner using radio frequency, infrared, or other technologies.

It should also be noted that the product summary generator 10 in accordance with one embodiment of the present invention is illustrated and discussed herein as having a plurality of modules or sub-modules which perform particular functions. It should be understood that these modules are merely schematically illustrated based on their function for clarity purposes only, and do not necessary represent specific hardware or software. In this regard, these modules and/or sub-modules may be hardware and/or software implemented and substantially perform the particular functions explained. Moreover, two or more of these modules may be combined together within the product summary generator 10, or divided into more modules based on the particular function desired. Thus, the present invention as schematically embodied in FIG. 1 should not be construed to limit the product summary generator 10 of the present invention.

In the illustrated embodiment, the product summary generator 10 is connected to a network 14 that allows publishing and remote access to the product summary generator 10. Moreover, the network 14 allows the product summary generator 10 to access various sources of information such as the manufacturer's database 15 and/or the vendor's database 16 to obtain various information regarding the products of a products category, and includes memory 17 to allow storage of such information. Such databases may be publicly accessible databases that are maintained by manufactures and/or vendors of such products being reviewed. The product summary generator 10 may be provided with an engine 18 that is adapted to access the manufacturer's database 15 and/or the vendor's database 16 via the network 14 to retrieve such information for storage into the memory 17. Moreover, the memory 17 may be any appropriate type of memory for storage of data and may be based on optical, magnetic or flash memory technologies.

The network 14 may be any type of communications channel, such as the Internet, a local area network (LAN), a wide area network (WAN), direct computer connections, and may be accomplished in a wireless manner using radio frequency, infrared, or other technologies, using any type of communication hardware and protocols. Of course, in other implementations, such information may be directly provided to the memory 17 product summary generator 10 without accessing manufacturer's database 15 and/or the vendor's database 16 via the network 14. The specific details of the above referenced devices and technologies are well known and thus, omitted herein.

The product summary generator 10 as shown in FIG. 1 includes a product attribute module 20 that is adapted to create and build various groups of information that may be used generate the naturally reading narrative product summaries with the alternative product recommendation. In particular, the product attribute module 20 is adapted to build scenario glosses, general category information, and product attribute information as described in further detail below. In addition, the product attribute module 20 is further adapted to generate price analysis information.

The product summary generator 10 also includes a secondary attribute module 30 that is adapted to build secondary attributes by reading the desired parameters, and is further adapted to utilize appropriate functions to generate the secondary attributes. In this regard, a rule definition database 36 with functions stored therein is provided so that functions can be retrieved and executed by the product summary generator 10.

An assertion model module 40 that is also provided in the product summary generator 10 is adapted to build assertion models by assigning a theme to each model, reading every template to the appropriate model, and by reading snippets to the appropriate template. In this regard, the assertion model module 40 is provided with an assertion model database 42, assertion template database 45, and snippets database 47.

Furthermore, the product summary generator 10 of the illustrated embodiment is also provided with a summary generation module 50 that is adapted to generate reserved themes, generate supplemental themes, format and assemble the generated sentences, and display the product summary. The various functions and features of each module of the product summary generator 10 are described in further detail below.

As previously noted, the preferred embodiment of the present invention provides a product summary generator 10 which generates product summaries that sound and read naturally so that they can be easily understood by the reader and information presented therein can be used to aid in purchasing decisions. Moreover, the preferred embodiment, the product summaries generated by the product summary generator 10 include a theme in which an alternative product is recommended.

As noted, product summaries are a body of text intended to concisely state several insights or observations about a particular product. Such product summaries typically include one or more paragraphs, each preferably having a plurality of sentences which provide facts, information and opinion regarding a particular product. Such product summaries generated by the product summary generator 10 of the present invention are substantively analogous to product reviews that are written by editors which are familiar to those of ordinary skill in the art except that product summaries are automatically generated by the product summary generator 10 in accordance with the present invention. Further, the generated alternative product recommendation provided in the product summaries is one or more sentences that identify and briefly discuss, an alternative product to the product reviewed in the generated other themes of the product summary.

Figure 2A:
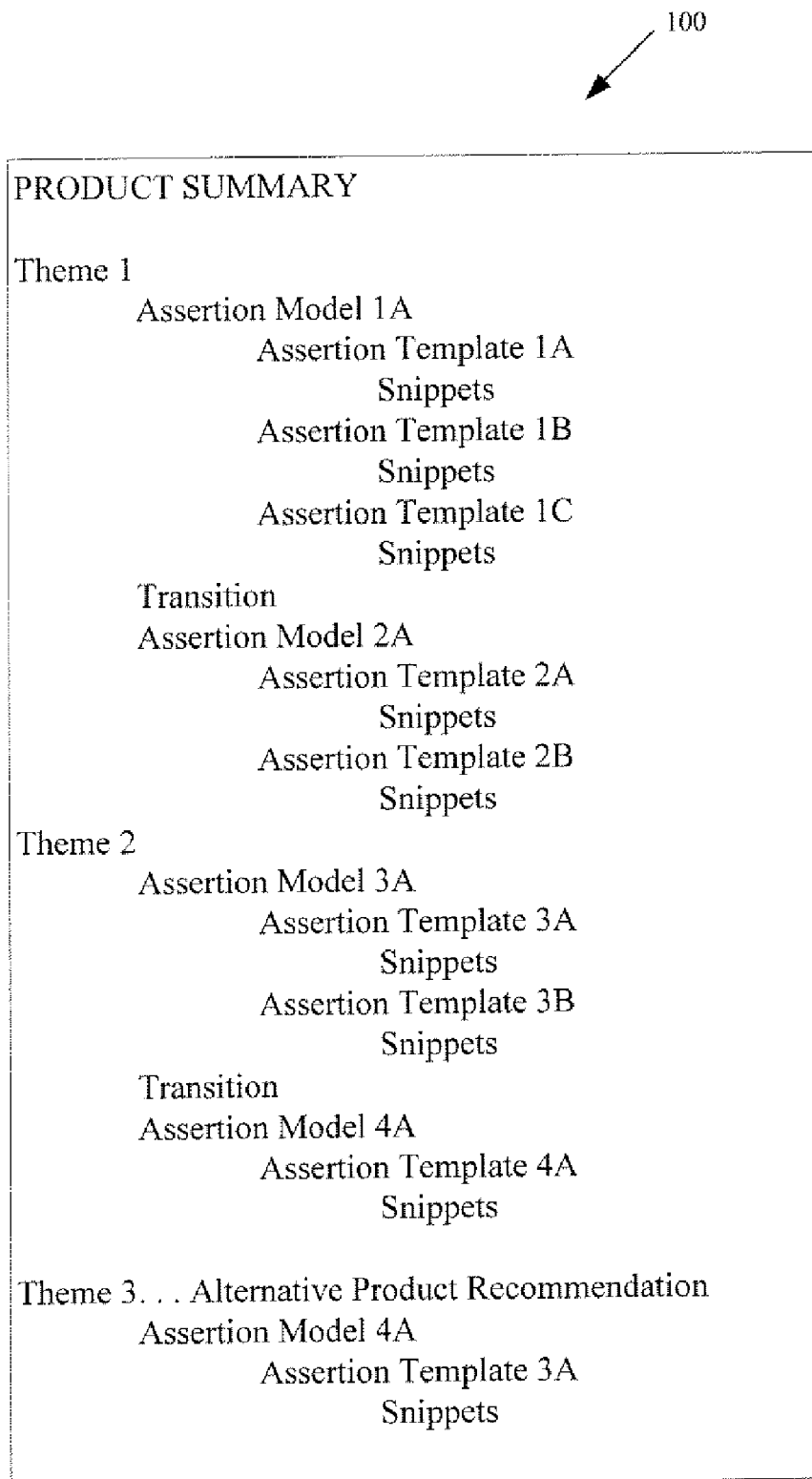
FIG. 2A is a schematic illustration showing the relationships between elements of a product summary that is generated by the product review generator of FIG. 1.

FIG. 2A shows a schematic structure of an example product summary 100 which illustrates the relationships between various elements of the product summary 100 which are generated by the various modules of the product summary generator 10 of FIG. 1. A corresponding portion of example product summary 110 is shown in FIG. 2B in which a digital camera is reviewed. As shown in FIG. 2B, the product summary that is generated by the product summary generator 10 sounds and reads naturally as if an informed individual actually wrote the review so that it can be easily understood by the reader, and information presented therein can be readily used to aid in purchasing decisions.

As can be seen in FIG. 2A, each product summary 100 is provided with a plurality of themes, each theme setting forth the intended purpose of one or more sentences and unifying such sentences in the generated product summary. For example, an "Introduction" theme may be provided to address the product being reviewed in general terms, and "Noteworthy features" theme may be provided to address the specific features of the product being reviewed that stand out.

Each theme includes one or more assertion models which are complete set of assertion templates which define various forms in which the assertion can manifest itself as a sentence. Assertions are a point or premise of information, fact, or opinion being made by any number of possible sentences which express that point. Assertion templates are sentence patterns, together with additional field names that form a sentence when the field names are filled. Each of the assertion templates have snippets associated thereto, a snippet being a single element of the assertion template and representing a sentence fragment, and including free-form text, word replacement sets, and/or field name, examples of which are described in further detail below. Moreover, transitional terms may be provided between the assertion models or at other locations of the product summaries as also described in further detail below.

Figure 3A:
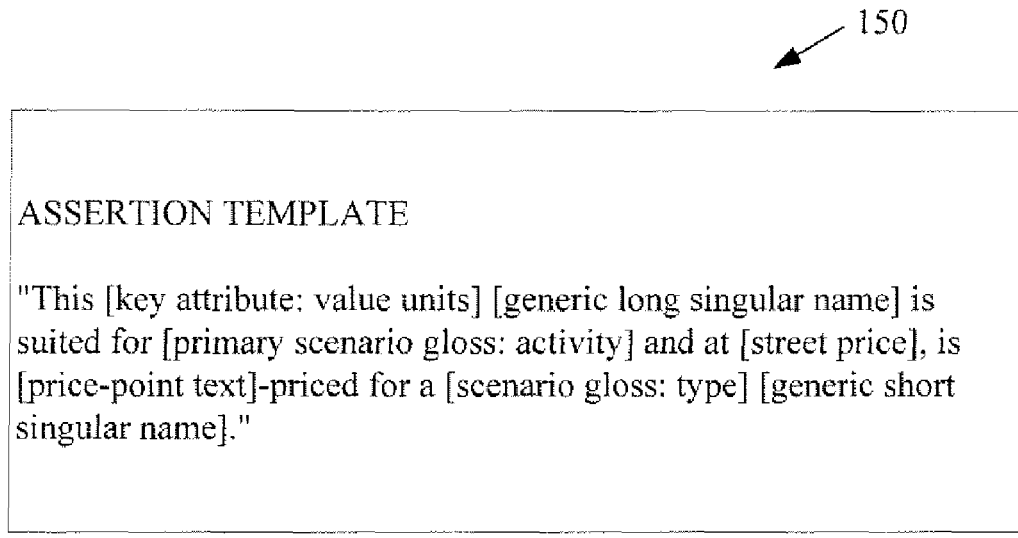
FIG. 3A is a schematic illustration of an example assertion template in accordance with the present invention.

FIG. 3A shows an example an assertion template 150 having various snippets that are filled in to generate a sentence that reads naturally. As shown, the illustrated example assertion plate 150 may be:

"This [key attribute: value units] [generic long singular name] is suited for [primary scenario gloss: activity] and at [street price], is [price-point text]-priced for a [scenario gloss: type] [generic short singular name]."

Figure 3B:
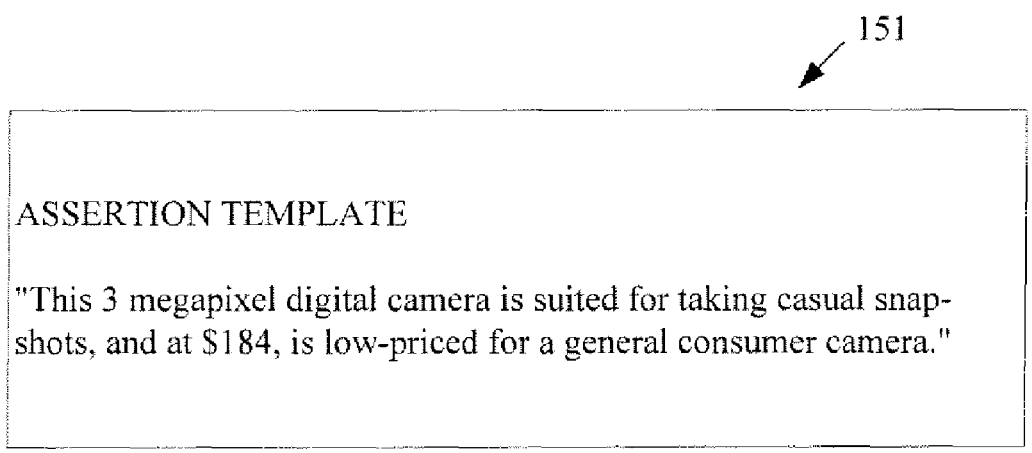
FIG. 3B is the assertion template of FIG. 3A which has been instantiated.

The assertion template 150 of FIG. 3A may then be instantiated into assertion template 151 as shown in FIG. 3B by filling in the various snippets to read:

"This 3 megapixel digital camera is suited for taking casual snap-shots, and at $184, is low-priced for a general consumer camera."

Of course, it should be evident that the above product summary 100 as shown in FIG. 2A is merely a schematic example and different numbers of themes, assertion models, assertion templates, snippets, and/or transitional terms may be provided that is tailored to the product summary being generated by the product summary generator 10 in accordance with the present invention. Moreover, it should also be evident that assertion template 150 as shown in FIG. 3A is also merely one example and other various templates may be provided and used. For example, assertion template for use within an alternative product recommendation theme may be provided which may be instantiated using various snippets that identify an alternative product and one or more attributes associated thereto.

The discussion below describes how the product summary generator 10 and the modules thereof as shown in FIG. 1 may be utilized to generate product summaries such as that shown in FIG. 2B. As previously noted, the examples of digital cameras are utilized extensively to facilitate comprehension of various aspects of the present invention. However, it should be kept in mind that the present invention as described herein is equally applicable for generating product summaries of various other products in product categories.

Referring to FIG. 1, the product attribute module 20 is adapted to create the primary feature comparison space. Most of the elements utilized by the product attribute module 20 are either information that is read directly from an input file (for example, memory 17) or database (for example, databases 15 and/or 16), or information that is derived from mathematical functions thereof.

The product attribute module 20 is adapted to build scenario glosses which are phrases established for each scenario to describe the activities, settings and environments, etc. pertaining to each usage scenario. The product attribute module 20 pulls into memory 17 of the product summary generator 10, certain semantic elements of a scenario, such as the type of user for a particular category of products (e.g. "for photo enthusiasts"), and the adjectival form of the scenario for attachment to the noun (e.g. "semi-pro" in "this is a semi-pro camera.").

In the illustrated embodiment of the product summary generator 10, the product attribute module 20 is also adapted to build general category information regarding products for which product summaries are generated. The product attribute module 20 reads into memory 17, information that is preferably generic to the entire category of products, i.e. information that is not at a product-specific level. For example, the product attribute module obtains primary attribute name and vocabulary, including the short and long, singular and plural forms of the attribute name, where applicable.

In particular, the product attribute module 20 is also adapted to obtain importance ratings of primary attributes that designate which attributes are important in a given category of products. Of course, such importance ratings of primary attributes are designated in a generic sense, and not from the point of view of a specific scenario or application of the product. The product attribute module 20 obtains the primary attribute units, if applicable. For example, in the category of digital cameras, resolution is measured in "megapixels" which serves as the units of the primary attribute of resolution. Such unit information may be obtained in any appropriate manner, including obtaining such unit information from an input file, or by mining it from other sources.

The product attribute module 20 is also adapted to pull into memory 17, any adjustments to attribute importance ratings (expressed, for example, on a scale of 1-10) for each usage scenario so that the importance ratings can be adjusted depending on the usage scenario. In accordance with one implementation, the adjustments may be "distance-to-goal" meaning that the importance ratings of attributes are adjusted by a certain desired percentage upward toward a maximum, or downward toward a minimum. For example, a +0.40 adjustment would mean increasing the importance rating 40% of the attribute toward 100% from where it stands initially. If the importance rating was initially a 5, this adjustment would increase the importance rating to a 7, and if the initial importance rating was a 7.5, this adjustment would increase the importance rating to an 8.5. Conversely, a −0.40 adjustment would mean decreasing the rating 40% toward zero from the initial rating. Thus, the initial rating of 10 would be lowered to a rating of 6, and an initial rating of 5 would be lowered to a rating of 3.

The above described adjustments to the importance rating of the attribute of a product category allows scenarios to be combined iteratively. If one scenario for digital cameras is for "fast-action use" and another is for "water resistant use", the two scenarios can be combined. For instance, if both scenarios increase the importance rating of the product attribute of ruggedness by 50%, then, if the rating of the ruggedness attribute was initially 6, the importance rating would be increased to 9. This would be due to the fact that the initial importance rating of 6 would be first increased to 8, and then an increase from 8 to 9.

In addition, language that allows expression of the fact that a product possesses the attribute is also obtained by the product attribute module 20, whether the possession has a positive connotation or a negative connotation. For example, in a category of products that require batteries, the neutral term may be "uses", but the negative equivalent may be "requires". Correspondingly, in evaluating a product with a single battery, a sentence may be generated that states that the product "uses a single lithium battery" as opposed to "requires 4 AA alkaline batteries."

The attributes may also be flagged as to whether a given primary attribute is a key attribute. In this regard, editors who initially set up the product summary generator 10 to allow automatic generation of product summaries may mark whether one or more of the primary attributes are considered to be definitive of a product category so as to be designated "key" attributes. An ordinary-language usage test of this is to ask which attributes are commonly used in definite descriptions of products. In the case where the category of products being evaluated is digital cameras, "resolution" would be a key attribute because of how common it is in the literature to see phrases such as "the latest 5-megapixel camera from . . . " The fact that "megapixel" is a unit of measure for "resolution" also indicates that resolution is a key attribute for the digital camera product category.

Furthermore, the product attribute module 20 of the product summary generator 10 is also adapted to obtain product attribute information and associated para-data for the products in a product category. In particular, the product attribute module 20 obtains the actual attribute values associated with the attributes of a particular product in a product category from any appropriate source. For example, in the example of digital cameras, an attribute value for the attribute of "resolution" would be 4.2 megapixels in its full native (non-interpolated) resolution for a particular camera. Such information would be associated with the particular camera.

Product information may be obtained by the engine 18 from the manufacturer's database 15 and/or vendor's database 16 via the network 14. The engine 18 may be provided with search engines having a crawler such as a robot, bot or automated site searcher. The crawler may automatically crawl from servers to servers having such information to gather the appropriate information. Of course, details of such search engines are well known in the art and need not be described in detail herein. Moreover, the product information may be provided to the product summary generator 10 in any other appropriate manner. For example, the information may be gathered by a device other than the product summary generator 10 of the present invention, and provided to the memory 17 of the product summary generator 10 for further processing and generation of the product summaries.

In addition, in the illustrated implementation of the product summary generator 10, the product attribute module 20 is also adapted to obtain primary attribute ranks for each of the products in the product category and read them into memory 17. The primary attribute ranks indicate the rank of each product relative to the other products in the product category based on each of the attributes, and may be determined in any appropriate manner. For example, the conventional method of percentile ranks may be used to obtain the primary attribute ranks. Alternatively, more sophisticated methods may be used to determine the primary attribute ranks. For example, competitive index for the attributes of the products may be determined using the method as set forth in U.S. patent application Ser. No. 10/265,189 filed Oct. 7, 2002 entitled SYSTEM AND METHOD FOR RATING PLURAL PRODUCTS, the contents of which are incorporated herein by reference.

If competitive indexes are determined and used for attribute ranks as set forth in the '189 application noted above, the product attribute module 20 may also be used to flag a product or attribute of the product for verification when competitive index for the attribute of the selected product deviates a predetermined amount from an average competitive index for the attribute of the category of products. This allows checking to see if there are corrupt data. For example, if a very inexpensive camera is listed as having $1/5000$th second shutter speed, which is among the fastest on the market, such an attribute would be considered a "noteworthy feature" for discussion in the generated product summary. However, such a feature would likely be too good to be true and may be based on corrupt data with a typographical error in which the actual shutter speed is $1/500$th second, not $1/5000^{th}$ second. Thus, by examining the competitive index when the competitive index of an attribute is very far below, or very far above what is typical of its price point, the product summary generator 10 may be adapted to refrain from making a comment about it within the generated product summary, and instead, flag the attribute for human verification.

Once the primary attribute ranks are determined, the product attribute module 20 calculates primary attribute severity values for each of the products. The severity value essentially expresses how seriously good, or seriously bad it is for a product to have a certain attribute value. In one implementation, severity values may be set to range from 0.00 to 1.00, where a very low or a very high severity is indicative of an attribute of the product that is strong interest to most consumers. The severity values are used in the present implementation because the primary attribute ranks do not provide an indication of which feature(s) stand out as exceptionally noteworthy or weak for the product on the whole which should be discussed in the generated product summary, even if competitive index described in the '189 application are used.

For example, a large-screen console television (hereinafter "TV") that is heavier than almost any other similar TVs by a few ounces will have a very low percentile rank or competitive index. However, because weight is not an important feature for console style televisions, a small amount of extra weight is not a severe condition with respect to the console TV, even though it is of very low rank compared to other lighter TVs. Conversely, another TV might be a few ounces lighter than all the other TVs, but this is hardly a very noteworthy feature.

Preferably, the severity value is a function of both the attribute rank (percentile, competitive, or other) and the importance rating of the primary attribute. In one implementation, the function utilizes an inflection algorithm that causes an inflection, whereby attribute values that are highly important (i.e. high importance rating) are pushed closer toward 0.00 when their attribute rank is low, but are held closer toward 1.00 when their attribute rank is high, while at the same time, this effect of pushing the severity value is not obtained when the importance rating is low.

The above described inflection may be obtained by any number of numerical methods so as to accomplish the above described effect. An example method is shown by the following formulas:

When Rank≧0.50 then Severity=Rank*(1−Degree+
(Degree*Importance))

and

When Rank<0.50 then Severity=Rank*(1−Degree+
(Degree*(1−Importance)));

where Degree is between 0.01 and 0.99. The degree of the inflection can be controlled by setting the Degree to a predetermined number. A higher predetermined number for Degree would produce a more radical inflection between attributes of high and low importance.

For example, when Degree=0.50 (the default setting), the formula comes out as follows:

When Rank≧0.50 then Severity=Rank*(0.50+
(0.50*Importance))

and

When Rank<0.50 then Severity=Rank*(0.50+(0.50*
(1−Importance)))

Numerous example calculations of severity values is provided below with Degree=0.50 to illustrate the operation of the inflection algorithm of the present embodiment.

If importance is 0.90 and Rank is 0.90; Severity=0.90*(0.50+0.45)=0.90*0.95=0.855

If importance is 0.60 and Rank is 0.90; Severity=0.90*(0.50+0.30)=0.90*0.80=0.720

If importance is 0.30 and Rank is 0.90; Severity=0.90*(0.50+0.15)=0.90*0.65=0.585

If importance is 0.90 and Rank is 0.60; Severity=0.60*(0.50+0.45)=0.60*0.95=0.570

If importance is 0.60 and Rank is 0.60; Severity=0.60*(0.50+0.30)=0.60*0.80=0.480

If importance is 0.30 and Rank is 0.60; Severity=0.60*(0.50+0.15)=0.60*0.65=0.390

If importance is 0.30 and Rank is 0.30; Severity=0.30*(0.50+0.35)=0.30*0.85=0.255

If importance is 0.60 and Rank is 0.30; Severity=0.30*(0.50+0.20)=0.30*0.70=0.210

If importance is 0.90 and Rank is 0.30; Severity=0.30*(0.50+0.05)=0.30*0.55=0.165

In the examples set forth above, it should be evident that the most noteworthy cases which are the first and last examples, have the highest and lowest severity values. The attribute having the highest severity value would correspond to the best attribute of the product being reviewed while the attribute having the lowest severity value would correspond to the worst attribute of the product being reviewed. Importance rating alone, or attribute rank alone, would not make these two cases stand out as being noteworthy for discussion. Mere multiplication of importance rating and attribute rank together would also not make these to cases stand out either. Thus, inflection algorithm such as that described above is desirable to produce the desired effect. The above described method allows the product summary generator 10 to determine the best and worst attributes so that naturally reading narratives can be generated regarding those attributes of the product being reviewed in the product summary 100.

Once the severity values of the primary attributes for a particular product are calculated, for example, in the manner described above, the primary attributes are placed in order of their severity values. In addition, their placement within the plurality of severity values are calculated so as to provide the placement-by-severity, for example, a primary attribute may be designated as being the 3rd most severe, etc. Furthermore, in addition to calculating placement-by-severity as described, the product attribute module 20 also calculates placement order according to a differential in the percentile rank or competitive index from the average percentile rank/competitive index of products in the same scenario.

The product attribute module 20 further determines an Average-Rank-Near-Price margin which allows identification of other products in the product category that are close enough in cost to be cost-comparative to a given product being reviewed. The near-price margin may be set to be around 10% so that products of the product category having prices within 10% of the price of the product being reviewed are identified. Of course, the near-price margin may be configurable so that it can be set at any desired level. The identified products within the near-price margin are taken as a subset and retrievably stored in memory 17 for later use, for example, in highlighting strengths or weaknesses of the product reviewed in the narrative product summary, or in generating an alternative product recommendation in the narrative product summary. In addition, the average attribute rank among the identified products, whether the attribute rank is based on percentile rank or competitive index, is calculated for each primary attribute.

In addition, the product attribute module 20 further determines an Average-Price-Near-Rank margin which allows identification of other products in the product category that are close enough in rank to be compared to a given product being reviewed. Again, the near-rank margin is configurable but may be approximately 5%. Thus, the near-rank margin allows determination of which products of a product category have a comparable value to the product being reviewed for a given primary attribute. The average price of the identified products is also determined. In the present implementation, the above described determination is preferably performed for every primary attribute of every product, and is retrievably stored in memory 17 for later use. This information can again, be used to highlight strengths or weaknesses of the product reviewed in the narrative product summary, or in generating an alternative product recommendation in the narrative product summary.

In one implementation, the product attribute module 20 of the product summary generator 10 is adapted to characterize the typical feature value of products costing nearly the same (among comparable products and/or among the entire category), and also adapted to characterize the typical price of products having nearly the same feature (among comparable products and/or among the entire category). To ensure that the generated product summary contains statements regarding value of the product when they are relevant, one or more threshold measures may be provided to determine when they are sufficiently noteworthy to merit a mention. This may be attained by the product attribute module 20 by determining two derivative measures, Value-For-Price and Price-For-Value, from the Average-Rank-Near-Price margin that was described previously above.

Value-For-Price may be defined as the Average-Rank-Near-Price minus the rank of the same attribute value of the product being reviewed. The Value-For-Price may be expressed as the difference value or be expressed as a percentage of the attribute valve of the product being reviewed. For example, if the Average-Rank-Near-Price for a camera's resolution is 0.44 and the rank of the camera's resolution is 0.36, then the camera's resolution Value-For-Price may be expressed as being 0.08. This means that 0.08 competitive points of surplus value with respect to resolution is provided by the average camera having similar price as the camera being reviewed. Stated in another manner, this means that the product being reviewed is at a deficit of 0.08 competitive points. When the Value-For-Price is above a certain configurable threshold, the product summary generator 10 may be triggered to generate statements referring to the Average-Rank-Near-Price of that product's attribute. The triggering mechanism may further be provided as a follow-up to identification of the most noteworthy features on the basis of their severity as discussed previously above.

Finally, the product attribute module 20 of the illustrated embodiment also generates price analysis information which can be used to characterize a reviewed product as being "expensive" or "low-priced", etc. This is attained by initially determining the global mean and standard deviation of prices for all products in a product category, regardless of scenario. In addition, global high, low, and median prices are also determined which also preferably includes the median high and median low. The price analysis is repeated with each subset of products that falls into each scenario.

The secondary attribute module 30 in accordance with the present implementation is adapted to build secondary attributes which are attributes that are formed by applying a function to one or more pre-existing attributes. Initially, the secondary attribute module 30 reads into memory 17, all of the functions and secondary attribute definition rules described below from the functions database 36 that have been manually edited by an editor(s) that initially sets up the product summary generator 10, and also validates the syntax and integrity of the secondary attribute definition rules. These secondary attribute definition rules are then used as tools by the secondary attribute module 30 to build the secondary attributes.

In the above regard, the secondary attribute module 30 supports various generic functions which may be provided in the functions database 36 that are standard to most mathematical and/or statistical analysis software packages. These functions may include:

AbsDiff=absolute value of the difference of two arguments
AbsPercDiff=absolute value of percentage difference of first argument relative to second argument
AvgOf=statistical mean of all arguments
Diff=first argument minus second argument
GreaterOf=greatest value of all arguments
LesserOf=least value of all arguments
MedianOf=statistical median of all arguments
PercDiff=percentage difference of first argument relative to second argument
PercOf=first argument measured as a percentage of second argument
Product=result of multiplying all arguments
Quotient=result of dividing first argument by second argument
Sum=result of adding arguments together
Test=first argument names attribute to be tested; subsequent argument pairs provide test case values, with their respective resulting values in square brackets Furthermore, the secondary attribute module supports 30 various specific functions that may be tailored expressly for facilitating generation of secondary attributes. These specific functions may include:

HigherRankOf=highest of corresponding competitive index of all arguments
LowerRankOf=least of corresponding competitive index of all arguments
PosThreshoid=first argument names attribute to be tested; subsequent argument pairs provide descending positive thresholds, each followed by the resulting value in square brackets
NegThreshold=first argument names attribute to be tested; subsequent argument pairs provide ascending negative thresholds, each followed by the resulting value in square brackets Of course, the above functions are provided as examples only and other functions may also be provided in other implementations of the secondary attribute module 30.

There may be multiple functions that are appropriate for the generation of a secondary attribute. Consequently, in the illustrated implementation, the multiple functions are all executed in sequence for the same secondary attribute. This multiplicity provides more than one way for the product summary generator 10 to attempt to generate the same secondary attribute, which is especially important in an advice-giving environment where there are multiple different ways that a product or a feature thereof can be useful or valuable, or not useful or valuable.

For example, in the product category of digital cameras, "suggested use" for digital cameras may be considered a secondary attribute. Clearly there are many multiple tests, and multiple possible outcomes, for how to derive this value. If the camera has a waterproof case, a suggested use might be for snorkeling. Alternatively, if the digital camera has a very high optical zoom, then "outdoor sightseeing photography" might be appropriate, etc. These multiple definitions can be defined successively.

Each particular secondary attribute, however, has only one main function associated with it in the present implementation. For more complicated secondary attributes, these functions can effectively be nested by making reference to previously created secondary attributes within a new secondary attribute.

The secondary attribute module 30 of the product summary generator 10 calls an appropriate function, retrieves and validates the arguments, observes value dimension specified, and performs string conversion as necessary. "Value dimension" refers to whether the desired value of the attribute in question is the attribute value, the attribute rank, the placement-by-severity, the placement-by-differential-rank, the average-rank-near-price, or the average-price-near-rank, as described in further detail below. All subsequent references within the secondary attribute assumes this value dimension which defaults to the attribute value itself. In many cases, the value dimension should be converted from a string to an integer or real number, and spelled-out numbers may be converted to digits, etc.

The secondary attribute can possibly require the presence of, or absence of, a particular value of another attribute. The secondary attribute module 30 of the present implementation is adapted to test for such a requirement so that if the test fails, a predetermined Fail-Value may be used. For example, for the secondary attribute "recommended minimum flash card size", the function may stipulate that the presence of a flash card slot in the camera is required. The fail value may be "N.A." indicating that flash card slot is not available.

The secondary attribute module 30 executes one or more functions described above to generate a secondary attribute, the appropriate function being called with the validated parameters. When the functions are executed and are about to return a value, the secondary attribute module 30 decides how to write the value back into the attribute record associated with the secondary attribute in view of the fact that there are often more than one function used to generate the secondary attribute. In this regard, rules may be provided in the function database 36 that may be accessed by the secondary attribute module 30. Such rules may include:

Override Rule: means if the primary attribute is instantiated more than once, then subsequent instantiations will overwrite previous ones.

Additive Rule: means if the primary attribute is instantiated more than once, then the values will be concatenated, as comma-delimited strings.

Optimize Rule: means if the primary attribute is instantiated more than once, then the new value will be an override if, and only if, the previously instantiated value is non-optimal; otherwise the old value will be retained. If more than one optimal value is instantiated, they will be additive with respect to each other. If at least one optimal value is instantiated, all non-optimal values are over-written and no further non-optimal values will be admitted.

The "override," "additive," and "optimize" rules are each mutually exclusive with the others. If the rule definition is additive, then the secondary attribute module 30 checks to determine whether pre-existing values exist. If they do, then the newly derived value is linked together onto the list of multiple value strings in the attribute record, and the attribute is marked as having multiple values. If there are no pre-existing values, the new value alone is written as a singular value for the generated secondary attribute. If the rule definition is for an override, then the secondary attribute module 30 replaces any existing attribute value with the newly derived value.

If the rule is for optimizing, then the secondary attribute module 30 first determines whether the newly derived value is optimal or not. If the newly derived value is optimal, the secondary attribute module determines whether there are pre-existing values which are non-optimal. If there are non-optimal pre-existing values, these values are deleted. Then, the secondary attribute module 30 determines if any pre-existing optimal values remain. If there are, the new value is linked onto the list and the attribute is flagged as having multiple values. If the new value itself is non-optimal, the secondary attribute module 30 determines if there are pre-existing values which are optimal.

If there are pre-existing values which are optimal, the new value is discarded, and the rule definition exits the function while leaving the attribute value unchanged. If there are no pre-existing optimal values, the secondary attribute module 30 checks if there are pre-existing non-optimal values. If there are, the secondary attribute module 30 links the new value and flag the attribute as having multiple values. If there are no pre-existing values, then the secondary attribute module 30 writes the new value as the singular value of the attribute. This optimize rule can thus, be used for creating several parallel primary attributes which have divergent means of instantiating the same secondary property.

In many cases, secondary attribute rules contain stipulations of positive connotation or negative connotation pertaining to the resulting attribute value. These connotations are mapped into the product based on the specific value it derives from the secondary attribute rule definitions. For example, on the secondary attribute for digital cameras of "largest print size recommended," the values of '5"×7"' or above, may be assigned a positive connotation, while those of '2"×3"' or lower, may be assigned a negative connotation, with print sizes in between being neutral.

The secondary attribute module 30 may be used by the editors or others for inputting the information, functions, and/or rules that are applicable for generating the secondary attributes. Any appropriate file(s) may be used such as a flat file, or files of a relational database. The data may be stored in any appropriate format such as tab-delimited format or various proprietary database formats. For example, the following chart sets forth file header fields for such files with a description for each header in the adjacent column. The header fields may be as follows:

| HEADER FIELD | DESCRIPTION |
| --- | --- |
| Property Name [flags] | The internal name of the property, with any flags (as to whether it is an override property, additive, or optimizing) |
| Display Name <features to mention> | The display name - this name can reference the names of other properties if placed in angle brackets. |
| Assumption <features to mention> | An assumption - dependent clause that explains assumption on which the building of this property is based - can also mentioned other properties in angle brackets. |
| Requisite feature [Value] | If another property must have a specific value in order for this secondary property to be triggered. If this condition fails, the fail value will be generated (see below). |
| Excluded Feature [Value] | If another property must NOT have a specific value in order for this secondary property to be triggered. If this condition fails, the fail value will be generated (see below). |
| Determiner | The grammatical determiner that would normally be appropriate to speaking of this property (e.g. "the", "a", "an", "some", "one"). |
| Copula | The grammatical copula used to attach this property to its value in a phrase, e.g. usually "is", "has", or in less frequent cases, "includes", "supports," etc. |

| HEADER FIELD | DESCRIPTION |
| --- | --- |
| Function [optional alternative value dimension] | The logical or mathematical operator on which the generation of the secondary property is to be based, e.g. Product, Quotient, PosThreshold. etc. In square brackets is the optional value dimension, for example, "rank" would mean to use the attributes' ranks instead of their values. |
| Units | Any units, if applicable, for this attribute, e.g, inches, megabytes, etc. |
| Fail Value | The value to generate if the function fails to produce a result, or if the tests for requisite or excluded feature are not passed. |
| First Argument [result], Additional Arguments [results] | The first argument to be passed to the function, and optionally, further arguments; in some cases, result values need to accompany each argument, depending on the function chosen. |

Referring again to the product summary generator 10 shown in FIG. 1, the assertion model module 40 is adapted to build assertion models by initially assigning a theme to each of the assertion models, reading every assertion template from the assertion templates database 45 associated to the appropriate assertion model, and reading every snippet from the snippets database 47 to the appropriate assertion template.

Every assertion model is designated by the assertion model module 40 of the product summary generator 10 as belonging to one or more themes. As previously described, themes typically correspond to the paragraphs of the finished product summaries such as that shown in FIG. 2B. In this regard, several reserved themes may be provided in accordance with one implementation of the present invention. As previously noted relative to FIG. 2A, an "Introduction" theme may be provided which gives a general overview or a non-evaluative description of the product. A "Noteworthy features" theme may be provided which highlights positive features of the product being reviewed relative to comparable products. A "Weaker features" theme may be provided which points out negative features of the product being reviewed relative to comparable products. In addition, a "Value" theme may be provided to discuss the "bang-for-the-buck" the particular product being reviewed offers in comparison to other comparable products. Furthermore, "Suitability" theme may be provided which identifies what scenarios, use-eases, or types of users are the best fit for the product in question. Finally, a "Alternative Product Recommendation" theme may be provided which identifies and briefly discusses an alternative product that the user may consider.

The aforementioned themes may all have resident procedures for defining their content. However, their core content may be supplemented by additional assertions defined in the configurable assertion models for each product category. This may be attained by merely assigning a reserved theme name to an assertion so that an editor thereby defines it as supplementary to that reserved theme.

Of course, supplemental themes may be provided by the assertion model module 40 as well, such supplemental themes being typically displayed in the generated product summary after the reserved themes. Such supplemental themes may address any aspect of the product category and may be appropriately named. An example of a supplemental theme for digital cameras may be "On storing pictures" theme in which assertion templates regarding storage capacity of the digital camera is addressed. In particular, the theme may identify and discuss whether a particular digital camera being reviewed is provided with a storage card or if such card must be purchased separately, and what the recommended card size for storing a satisfactory amount of pictures is, etc.

As previously noted, the assertion model module 40 reads every assertion template from the assertion templates database 45 that correspond to the appropriate assertion models in the assertion models database 45, each record in the assertion model defining an assertion template. As schematically shown in FIG. 2A, an assertion template includes one or more snippets from the snippets database 47, and revolves around one particular key attribute which may be a primary attribute or a secondary attribute.

It should be noted that a plural number of assertion templates are typically assigned to the same assertion name, but often have different key attributes. The fact that these assertion templates are assigned to the same assertion name generally indicates these assertion templates are all making essentially the same point about a product being reviewed, except that the assertions are being made in different ways.

In addition, as also previously noted, the assertion model module 40 reads the snippets from the snippets database 47 to the appropriate assertion template, each snippet being a short phrase, usually not capable of standing as a sentence by itself. In the present implementation, each of the snippets in the snippets database 47 may contain three kinds of content: static text, minor variants, or references to attributes or parameters. Static text never changes within the assertion template from the way it is entered by the editor when the product summary generator 10 was set up. Minor variants are inter-changeable phrases which are randomly chosen from a list input by the editor by the product summary generator 10. For example, minor variants may be the phrases "However," and "On the other hand," which are substantially equivalent in meaning to one another. References to attributes or parameters are lookups of any attributes, whether primary or secondary, or to parameters of the key attribute, such as its name, its units, its vocabulary elements, etc.

In a manner similar to the secondary attribute module 30 described above, any appropriate file(s) may used to input information regarding the assertion models, for example, via a flat file, or files of a relational database. The data may be stored in any appropriate format such as tab-delimited format or various proprietary database formats. The following chart sets forth file header fields for such files with a description for each header in the adjacent column. The header fields may be as follows:

| HEADER FIELD | DESCRIPTION |
| --- | --- |
| Assertion Name | The internal name of the assertion |
| Key Attribute | The attribute to which it should be assumed all subsequent references apply, within this template, unless stated otherwise. |
| Theme | The theme under which this assertion falls. |
| Excluded Feature Name [Excluded Value] | If another property must NOT have a specific value in order for this secondary property to be triggered. If this condition fails, the fail value will be generated (see below). |
| Connotation Attribute | The attribute from which this assertion derives its connotation. Can be negative, positive, or neutral. |
| Contiguous transition | Verbiage to use if this assertion maintains the same connotation as the sentence preceding it. |
| Contrasting transition | Verbiage to use if this assertion bears a different connotation from the sentence preceding it. |
| Template Elements <Variables in angle brackets> | Template elements each have any combination of static text, variables that can name any attribute or elements of attributes, and minor phrase variants in square brackets (e.g. ["barely", "hardly"] would result in random selection of "barely" or "hardly" in the same position in the sentence). |

Referring again to the illustrated embodiment of the product summary generator 10 of FIG. 1, the summary generation module 50 is adapted to generate reserved themes, generate supplemental themes, format the generated sentences, assemble bullet items into sentences, and display the product summary such as that shown in FIG. 2B with an alternative product recommendation therein. The summary generation module 50 generates the reserved themes utilizing the key attributes and the primary scenario, as well as the price analysis. These elements are excellent ways to introduce a product to a potential buyer who is browsing various products of a product category. The example assertion template 150 as shown in FIG. 3 is appropriate for the introduction theme, which when instantiated, may read:

"This 3 megapixel digital camera is suited for taking casual snap-shots, and at $184, is low-priced for a general consumer camera."

The summary generation module 50 of the product summary generator 10 of the illustrated embodiment also generates the noteworthy features theme by initially determining the noteworthy features, whether the features are noteworthy for being positive or negative. To identify noteworthy features, the summary generation module 50 first examines the placement-by-severity in which the primary or secondary attributes are ordered based on their corresponding severity values, and selects the attributes having the highest severity values, but only if the severity values are above a predetermined high-severity threshold. Preferably, the high-severity threshold is a number that is configurable for the product summary generator 10. The purpose of the high-severity threshold is that, if an attribute is not very severe, then the attribute is not worth generating a sentence about in the product summary. The summary generation module 50 may be adapted to select a predetermined number of highest severity attributes that are above the high-severity threshold so that sentences are generated for those attributes in the product summary.

If the predetermined number of such attributes are not present, the summary generation module 50 examines the placement-by-differential-rank in which attributes are ordered by their attribute ranks. This allows determination of which attributes of the product is markedly superior than most of the other products in the product category sharing its primary scenario and costing around the same price. Again, a predetermined threshold may be implemented so that if no attributes lie above this threshold, the summary generation module 60 will not generate any sentences in the product summary highlighting any noteworthy features. Appropriately, the summary generation module 50 of the product summary generator 10 may find no noteworthy features at all for a particular product being reviewed since some products are truly not noteworthy.

In addition, the editor may have found additional secondary attributes during setup of the product summary generator 10 which, under certain conditions, can be considered noteworthy. These secondary attributes may be added on a product category basis. For example, in digital cameras, the editor may decide that any digital camera having a water-tight case for use while snorkeling is noteworthy for that attribute since it is generally not a common attribute among digital cameras. Since this attribute is unlikely to be highly important among digital cameras generally, it is unlikely to pass the tests within the resident procedures for finding "noteworthy" features, and thus, would need to be added as a supplemental assertion.

Of course, in most instances, it would not be sufficient to merely find and mention a noteworthy feature since the primary object of the product summary generator 10 is to provide user friendly information regarding the product being reviewed. In order to be relevant and useful to most prospective buyers of a product, the noteworthy feature must be placed in some sort of context, or otherwise explained. The summary generation module 50 should thus provide an indication of whether the feature is noteworthy in an absolute sense, or in a relative sense. Some features are noteworthy with respect to entire category of products, and so are "absolutely" noteworthy, but are not noteworthy relative to one or more attributes such as product price, or even the primary scenario.

For example, there may be a digital camera on the market with the primary scenario of "semi-professional photography," selling for around $8,000 and having an 11-megapixel resolution. This resolution is, in the current market, very high and ranks second highest of over two hundred models on the market. Obviously, this feature is noteworthy in the "absolute" sense. However, relative to its price, this is not noteworthy since $8,000 for a digital camera is very expensive, and the few cameras having comparable resolution are priced similarly. Moreover, among the small subset of digital cameras in the digital camera category that are indicated as "semi-professional", this resolution is again, not particularly noteworthy. By contrast, a compact camera costing only $150 with 3× optical zoom, is not noteworthy in the absolute sense since 3× optical zoom is middle-of-the-road. However, considering the compact camera's size and its very low price, it is noteworthy in the relative sense.

Each of these various types of noteworthiness requires a different contextualization statement in the product summary that is generated. For a feature that is noteworthy only in the absolute sense, the summary generation module 50 of the product summary generator 10 may be adapted to generate a sentence that would say something like:

"This is superior to most cameras, but is to be expected for a camera of this price."

For a feature that is noteworthy only relative to its primary scenario, the summary generation module 50 of the product summary generator 10 may be adapted to generate a sentence that would say something like:

"This is not particularly better than most other cameras at a similar price, but it is rare among compact cameras."

For a feature that is noteworthy for the product's price, the summary generation module 50 may be adapted to generate a sentence that mentions the typical price of comparable products boasting this feature. For example, for a digital camera costing $300 with very high resolution, the summary generation module 50 may be adapted to generate a sentence that would say something like:

"The typical cost of cameras having comparable resolution is around $640."

The finished assertion regarding a noteworthy feature may be referred to as the "ranked attribute description" because it is addressing one of the predetermined number of most noteworthy attributes, and is describing the noteworthy attribute by the virtue of which the product being received the attribute ranking. For instance, the "aspect" of a shutter speed that made it noteworthy may be the fact that the shutter speed is "faster" than that of "most cameras costing the same."

The summary generation module 50 further generates the weaker or negative features theme which is the logical converse of noteworthy features, with the exception of some of the explanatory elements. Because of the fact that the product summary generator 10 is primarily for the purpose of assisting a person in making a purchasing decision, when an important feature is weak or actually negative, it would be desirable for the product summary generator 10 to direct the user, for the sake of comparison, to a comparable product that is stronger or more positive for that particular feature.

A comparable product would typically share the same primary scenario, cost about the same, and be similar with respect to the key feature of the product category. For instance, for digital cameras, comparable resolution may be required to be a comparable product since resolution is the most important feature. Thus, if a compact digital camera is being reviewed, another compact digital camera would be noted as being comparable if it falls within the near-price margin, and has a resolution that falls within the near-rank margin. Once all the comparable products for the reviewed product are determined, the comparable product having the highest value rating (such as percentile rank or competitive index) for each attribute is stored. This comparable product may be referred to in the weaker features theme, and may later even be identified as an alternative product recommendation theme.

In the above regard, in cases where the reviewed product is found to be weak in some noteworthy sense, a corresponding comparable product having the highest value rating for the attribute for which the reviewed product is weak, may be referenced within the product summary. Thus, in the present example, if a 3-megapixel compact camera costing $320 is weak in its optical zoom and has only 2×, the product summary generator 10 would identify the best comparative product in respect to zoom, and after mentioning that this particular feature is weak, follow-up with a sentence that says something like:

"For example, the HP 725xi, a 3.1 megapixel compact camera at around $329, has 4× optical zoom."

The summary generation module 50 further generates the value theme by contextualizing the value rating of the product, whether the value rating is based on percentile rank or competitive index as described in U.S. patent application Ser. No. 10/265,189 incorporated by reference above. This means explaining whether the value rating, if noteworthy (either bad or good), is driven more by price, or driven more by features. For example, a digital camera with better-than-average features but that is overpriced, and a camera with a slightly-below-average price but far-below-average features, may have potentially the same value rating. However, these digital cameras both have the same value rating for different reasons. In the former case, the summary generation module 50 may generate a sentence that would say something like:

"Despite this camera's excellent features, the relatively high price makes it a poor value for the dollar."

In the latter case, the summary generation module 50 may generate a sentence that would say something like:

"Despite costing less than most cameras on the market, the inferior features of this camera cause it to be a poor value for the money."

The summary generation module 50 may be triggered to address the value of the product being reviewed in any appropriate manner. In one implementation, this may be attained by utilizing the Value-For-Price as determined by the product attribute module 20 as discussed previously.

Another element of the value theme is that the summary generation module 50 finds the highest or lowest placement-by-rank-differential. This is useful because a product that is generally mediocre in value, neither very good or bad, may nonetheless, be exceptionally good or bad with respect to one important attribute, and the person may like to know this fact. For example, a camera with average value may have a very fast shutter speed for its price. Analysis of this fact can be used by the summary generation module 50 to generate the comment:

"Overall this camera has average value for the money, based on features. However you would typically pay about $80 more to get a camera having this fast a shutter speed,"

Furthermore, supplemental assertions may be offered by the editor that are category specific. For example, 'Bluetooth' wireless ability may be an expensive feature for manufactures to provide it in a digital camera. If a camera is provided with such a feature, the price of the camera will reflect this fact and may count as a good value. However, the editor may recognize that this is not a very important feature, and not of very much usefulness to most users of the product category. In this case, a secondary attribute could be introduced to state this fact where applicable, and the summary generation module 50 may generate a sentence that would say something like:

"Although this camera has relatively good value for its features, a substantial part of the price you are paying accounts for the Bluetooth ability, which only a small number of users will find useful."

Moreover, the summary generation module 50 may be adapted to generate the suitability theme through contextualization of the primary scenario. The primary scenario is the scenario in which a product scores the highest in its value rating as described in the '189 application or a scenario that has been manually set as to be the primary scenario by the editor. The various scenario glosses which are phrases established for each scenario to describe the activities, settings and environments, etc. pertaining to that scenario, are easily assembled into a sentence by the summary generation module 50. In addition, of the reserved themes described above, suitability is most likely to have supplemental themes added to it, since use cases are so specific to the product category in question.

For example, for digital cameras, the editors that set up the product summary generator 10 of the present invention may desired to characterize which digital cameras as being suitable for sports-action photography, for instance, digital cameras having fast shutter speeds and short delays between shots. This would of course be a secondary attribute, which would become the basis of an assertion assigned to the "Suitability" theme.

In many cases, an attribute will be unknown to most users, or the meaning of its various values will not be of clear relevance in their minds. In such cases, an optional, generic explanation can be attached to any sentence referencing such an attribute. For example, for shutter speed, the summary generation module 50 may be adapted to generate a sentence that would say something like:

"Faster shutter speeds allows you to 'freeze' the action in a snapshot, and also help cancel the 'shake effect' of an unsteady hand when shooting with a high powered zoom."

The product summary generator 10 may also be provided with a configurable verbosity setting in which the editor and/or the user can select the length of discussion provided by the generated product summary so that the product summary may be really short, really long, or in between. Based on the verbosity setting of the product summary generator 10, the generic explanation may be either included or omitted.

Many assertions described above read perfectly fine when taken in isolation. However, when these assertions are assembled into a product summary, they can combine in ways that are entirely unnatural sounding. Therefore, the product summary generator 10 of the illustrated embodiment is adapted to ensure that the product summary generated reads naturally and in a narrative manner. In particular, the summary generation module 50 may refer to the same thing or attach the same sort of predicate twice in a row, which is not natural in human language. This may be resolved by merging two assertions into one.

For example, in providing discussions regarding noteworthy features, two features may be found that are both noteworthy in an absolute sense, but not in a relative sense. In the example of digital cameras, the two features may be resolution and shutter speed. Independently, the two assertions might be formed by the summary generation module 50 as follows:

"Noteworthy features: Has 5.1 megapixel resolution, which is considerably better than most cameras, although it is to be expected in a camera costing this much. Has 1/5000th second shutter speed, which is much faster than that of most cameras, although it is to be expected in a camera costing this much."

Note that in the above example, the two assertions would read fine and naturally when read independently. However, when the two assertions are read in succession, the two assertions sound robotic. Therefore, the product summary generator 10 may be adapted to monitor the result type of the description generated relative to the ranked attribute as discussed above relative to the noteworthy features theme. When the product summary generator 10 receives the same result type twice in a row, it may be adapted to adjust the grammar accordingly to generate a sentence that would say something like:

"Noteworthy features: Has 5.1 megapixel resolution and 1/5000th second shutter speed, both of which are superior to most cameras on the market, but to be expected in a camera costing this much."

As can be appreciated, by monitoring repetition of references or predicates, an assertion that merges two different assertions while reading naturally can be generated by the product summary generator 10. Other forms of repetition may include, but are not limited to: mention of two features are exceptional for the scenario in question; mentioning that a particular competitive product outperforms the current model in two attributes at the same time, etc. Furthermore, any number of grammatical forms may be used to merge or connect these assertions. For example, providing the word "'also" in between the two independent assertions, or completely merging the assertions into a single sentence as described above, may be used to merge or connect the assertions.

Many secondary attribute values have negative or positive connotations associated with them. Furthermore, every assertion template may optionally designate the attribute from which it derives its own connotation, for example, the key attribute of the template. When generating a product summary, the product summary generator 10 is adapted to monitor the connotation of the preceding and succeeding assertion templates from which each assertion is being generated. It notes whether the transition between the two is contiguous or contrasting, i.e. whether it is the same, or not the same connotation. In such an implementation, a snippet for both conditions, contiguous and contrasting may be provided within each assertion template which can be appropriately used based on the desired connotation. The snippets can be as simple as just the text string "Also, . . . " for contiguous transition, and the string "However, . . . " for contrasting transition. Of course, other snippets may be provided as well that has more structure such as the phrase "On the other hand, when it comes just to [attribute short singular name], . . . . "

Because the product summary generator 10 of the present invention is primarily designed for the purpose of facilitating the evaluation of products in one or more product categories, the flow between negative and positive remarks is important to the naturalness of the text. Tracking the connotation context and using the appropriate contiguous and contrasting transitional phrases as described above provides this ability and results in generation of product summaries that sound natural and narrative as if the product summaries were written by a person such as an editor.

In fact, the lack of such transitions can actually make an otherwise natural text seem contradictory. For example, consider the following paragraph that has been generated with proper transitions:

"Overall, this camera's features are average for this price point. On the other hand, when it comes to resolution, you would typically have to pay around 22% more to get a general-purpose camera that matches its 3.2 megapixels."

The same paragraph would read very differently if transitions were disregarded:

"Overall, this camera's features are average for this price point. You would typically have to pay around 22% more to get a general-purpose camera that matches its 3.2 megapixels."

It should be very clear that in the latter version, the second sentence seems to contradict the first and is likely to be dissonant in the mind of the reader. In the former version, the second seems to supplement and complete the first one.

As described above relative to FIG. 2A, the product summary generated by the product summary generator 10 of the illustrated embodiment is provided with a plurality of themes such as "Introduction" and "Noteworthy Features", each theme setting forth the intended purpose of one or more sentences and unifying such sentences in the generated product summary. In this regard, the summary generation module 50 may be implemented to generate a product summary with a separate theme such as "Alternative Product Recommendation" theme that allows generation of a narrative sentence or sentences that recommend the alternative product to the user for consideration.

The alternative product recommended may be the same as the comparable product discussed above which may be identified for the consumer in the narrative of various themes to facilitate assessment of the selected product that is reviewed in the product summary. However, the alternative product may also differ from the comparable product in that the actual product recommended may not be really comparable to the selected product which is reviewed by the product summary generated. For example, an alternative product that is outside the near-price margin may be recommended. In another example, an alternative product that is outside the near-rank margin may be recommended. In yet another example, an alternative product that has a primary scenario that is different from the selected product reviewed may be recommended. Such alternative products would generally not be considered comparable to the original selected product, but nonetheless, be recommended as described in further detail below.

As shown in FIGS. 2A and 2B, the sentence providing the alternative recommendation may be located within the generated product summary 100, after the weaker or negative features theme, for example. Thus, in another example of digital cameras, if a 3-megapixel compact camera costing $320 is weak in its optical zoom and has only 2×, the summary generation module 50 may be adapted mention this weakness in the weaker features theme, and then, provide a recommendation regarding an alternative product in the alternative recommendation theme (for example, Theme 3) thereafter with a sentence that says something like:

"You may want to consider the HP™ 725xi, a 3.1 megapixel compact camera at around $329 which provides similar features but has 4× optical zoom."

Of course, the sentence recommending the alternative product may be provided in a different location within the product summary in other implementations.

The alternative recommendation theme may be implemented in a similar manner as the other themes of the product summary as discussed previously. The assertion models module 40 may retrieve an appropriate assertion model from the assertion model database 42 created for the alternative recommendation theme to generate the alternative recommendation. In particular, an assertion model with a set of assertion templates implemented as one or more sentence patterns may be retrieved from the assertion templates database 45 and used in conjunction associated snippets of the snippets database 47 to generate one or more sentences that recommend the alternative product in a naturally sounding manner.

Referring again to FIG. 1, the product summary generator 10 in accordance with the illustrated embodiment, includes an alternative product selection module 60 which identifies and/or selects the alternative product to recommend from a plurality of candidate alternative products that are stored in the alternative products database 64. The alternative product selection module 60 may select the alternative product recommended based any appropriate criterion. Thus, the alternative products database 64 may include attributes, severity values for each of the attributes, and other determined values, as well as other information regarding each of the candidate alternative products in a particular product category. In addition, the alternative products selection module 60 may further specify predetermined values for various criterion such as the near-price margin, near-price margin, and severity threshold values which may be utilized in the manner described in further detail below.

It is initially important to recognize that the alternative product that is recommended in the generated product summary by the product summary generator 10 may be a different brand, i.e. a product from a different manufacturer. However, it should also be appreciated that the alternative product recommended may be a different model of the same brand (i.e. from the same manufacturer) that is superior to the product reviewed in the generated product summary.

The alternative product that is selected from the plurality of candidate alternative products stored in the alternative products database 64 by the alternative products selection module 60 may share the same primary scenario, cost about the same, and be similar with respect to the key feature of the product category as the product reviewed in the generated product summary. However, as noted above, the selected alternative product recommended may be superior to the selected product being considered by the consumer and reviewed by the generated product summary, such recommendations regarding superior products being more likely to be followed by the consumer. Thus, the alternative product recommendation theme can be used to up-sell and encourage the consumer to purchase a more expensive product.

The alternative product identified and/or selected by the alternative product selection module 60 from the plurality of candidate alternative products of the alternative products database 64 may be attained based on the primary scenario in which a product scores the highest in its value rating, or a usage scenario that has been indicated as being the primary scenario. Thus, for the example of digital cameras, the alternative product selection module 60 may be implemented to only recommend alternative products that are suitable for sports-action photography, for instance, if this was the primary scenario for the digital camera being reviewed in the generated product summary.

In other implementations, other criterions may be set for which the recommended alternative product must satisfy. For instance, again for digital cameras, the alternative product selection module 60 may require the alternative product recommended in the generated product summary to have a comparable resolution that falls within the near-rank margin, and have a price that falls within the near-price margin. Thus, the alternative product selected by the alternative product selection module 60 from the plurality of candidate alternative products may be a product which is substantially the same, or better, with respect to near-rank margin, or near-price margin, severity values for a particular attribute, etc. Of course, the above noted criteria are merely provided as examples and any appropriate criteria, including combinations of those noted above, may be used by the product summary generator 10 to determine which alternative product from the plurality of candidate alternative products should be recommended to the consumer.

The selection of the alternative product to be recommended may be implemented in any appropriate manner. In the present embodiment, the alternative product selection module 60 may be implemented to calculate severity differentials between each of the plurality of attributes for the plurality of candidate alternative products and the consumer selected product about which the narrative product summary is generated. This calculated severity differentials, severity values, near-price margin, near-rank margin, as well as the scenario of the selected product can be used by the alternative product selection module 60 of the product summary generator 10 to identify and select an alternative product from the plurality of alternative products for recommendation. Nine example cases are described in detail below that can be utilized to identify appropriate candidate alternative products that may be selected for use in providing the alternative product recommendation. Of course, it should be kept in mind that these cases are examples only and the present invention may be implemented in a different manner utilizing different criteria, etc.

In the first case, the alternative product selection module 60 may select the alternative product for recommendation in the product summary narrative by identifying a candidate alternative product in the alternative products database 64 which provides a similar price, but better features than the selected product for which the narrative product summary is generated. In this regard, the alternative product selection module 60 may select a candidate alternative product which is within a predetermined near-price margin of the selected product, has at least one attribute with a severity value that is above a predetermined severity differential threshold, and has the same primary scenario as the selected product.

In the second case, the alternative product selection module 60 may select a candidate alternative product which has similar features, but a lower price than the selected product for which the narrative product summary is generated. This may be attained by selecting a candidate alternative product which is within a predetermined near-rank margin for the key attribute and for all attributes of the selected product that are above a predetermined high severity threshold, is priced lower and outside a predetermined near-price margin, and has the same primary scenario as the selected product.

In the third case, the alternative product selection module 60 may select a candidate alternative product which has better features, but a lower price than the selected product for which the narrative product summary is generated. This may be attained by selecting a candidate alternative product which has at least one attribute with a severity value that is above a predetermined severity differential threshold, is priced lower and outside a predetermined near-price margin, and has the same primary scenario as the selected product.

In the fourth case, the alternative product selection module 60 may select a candidate alternative product which has similar features, and a similar price as the selected product for which the narrative product summary is generated. This may be attained by selecting a candidate alternative product which is within a predetermined near-price margin, is within a predetermined near-rank margin for the key attribute and for all attributes of the selected product that are above a predetermined high severity threshold, and has the same primary scenario as the selected product.

In the fifth case, the alternative product selection module 60 may select a candidate alternative product which has similar features, and a similar price as the selected product for which the narrative product summary is generated, but is identified as being intended for a different usage scenario. This may be attained by selecting a candidate alternative product which is within a predetermined near-price margin, is within a predetermined near-rank margin for the key attribute and for all attributes of the selected product that are above a predetermined high severity threshold, and has a different primary scenario than the selected product.

As previously noted, the alternative product recommended may be a different model from the same manufacturer that is superior to the product reviewed in the generated product summary. In this regard, in the sixth case, the alternative product selection module 60 may select a candidate alternative product to provide a comparable up-sell product which has the same usage scenario and is the same brand as the selected product for which the narrative product summary is generated, except having better features and a higher price. This may be attained by selecting a candidate alternative product which is priced higher and outside a predetermined near-price margin; has at least one attribute with a severity value that is above a predetermined severity differential threshold, is from the same manufacturer as the selected product, and has the same primary scenario as the selected product.

Alternatively, in the seventh case, the alternative product selection module 60 may select a candidate alternative product to provide a comparable up-sell product which is the same brand as the selected product for which the narrative product summary is generated, except having better features, a higher price, and a different usage scenario. This may be attained by selecting a candidate alternative product which is priced higher and outside a predetermined near-price margin, has at least one attribute with a severity value that is above a predetermined severity differential threshold, is from the same manufacturer as the selected product, and has the same primary scenario as the selected product.

In the eighth case, the alternative product selection module 60 may select a candidate alternative product to cross-upsell in which a product from a different manufacturer that is greater in price and features than the selected product, and preferably within a predetermined near-rank margin, is recommended. In this embodiment, the alternative product may be selected either from within the same usage scenario, or from a different usage scenario. This case of cross-upsell is useful when the premier brand's products, for which an alternative product recommendation is desired, does not offer any product that is really better than the selected product for which the narrative product summary is generated. Thus, if no products of the premier brand provides superior features for the price, lower price for the features, or similar price and features, an alternative product from the premier brand can be identified and selected for recommendation, even though the alternative product may cost more.

In still the ninth case, the alternative product selection module 60 may select a candidate alternative product which is a "budget alternative" product from the same manufacturer by recommending a "downsell" product with a lower price and likely a bit less features, but preferably within a predetermined near-rank margin. In such a case, the candidate alternative product may be selected from within the same scenario or from a different scenario. This case is valuable when the selected product for which the narrative product summary is generated happens to be one of the most expensive, most fully featured products that the manufacturer offers so that there are no other product that can be recommended as better so as to allow upselling. Thus, in the described case, the message to the end user in the alternative product recommendation theme may be "if the model you are looking at is a bit too expensive for your budget, please consider this other model from the same brand, but which costs less, and requires you to merely trade off a couple of features to get the lower price."

It should be emphasized that the above described cases are just example embodiments, and any of the embodiments can be modified or otherwise altered in other implementations based on the various considerations associated with implementing the product summary generator 10. For example, rather than identifying and selecting for an upsell beyond the near-price margin, the system may be implemented to identify and select an upsell alternative product which is higher in price by a certain amount than the product for which the product summary is generated.

Of course, more than one of the candidate alternative products may satisfy each of the desired criteria that are set forth in each of the various cases described above. In such instances, the candidate alternative products which best satisfy the criteria of each of the cases can be identified, and the alternative product select module 60 can then select one of the identified candidate alternative products for recommendation. In this regard, determining which of the candidate alternative products best satisfy the criteria may be facilitated by optionally weighting or biasing the determination to favor one candidate alternative product over the others.

For example, selection of a candidate alternative product may be selected by favoring one type of alternative product recommendation over another. This may be based on user behavior analysis which shows one type of alternative product recommendation is more effective in encouraging the user to follow the generated recommendation, for all users generally, or for users within a certain category. Alternatively, this may be based on analysis for a certain user who is making a repeat visit to the website, for example, and who has shown a predilection toward one type of alternative product recommendation in the past, e.g. shown to opt for a lower price for the same features, rather than for a chance to get extra features at the same price.

In another example, selection of a candidate alternative product may be facilitated by favoring one manufacturer over another, if more than one manufacturer's products are represented and are available for selection and recommendation in the alternative product recommendation theme. This may be based on any business reason, whether the reason is revenue driven or other strategic consideration.

In still another example, selection of a candidate alternative product may be facilitated based on text of the possible alternative product recommendation. In particular, the administrator of the product summary generator 10 or a website serviced thereby, may prefer lengthier texts over shorter ones, or prefer alternative product recommendations that point to a particular scenario of product with the belief that the particular scenario is currently "in vogue". For instance, if smartphones or camera-bearing devices are popular and are considered to be "the hottest thing" in handheld PDAs, the administrator may desire to bias the alternative product recommendations to direct the end user to candidate alternative PDA products that have these particular features.

In yet another example, selection of a candidate alternative product may be facilitated by favoring variation, either among the alternative product recommendation types, scenarios, and/or brands, so that if more than one alternative product recommendation is displayed, the selected alternative product that is recommended is not the same brand or type. Any of the above described biases, weightings or other parameters may be used to aid in selection of the candidate alternative product. However, such biases and weightings should not be overly emphasized in the preferred embodiment so as to neutralize the natural and logical assessment within the alternative product selection module 60 that identifies and recommends the best, most favorably comparing alternative product.

Preferably, the alternative product selection module 60 considers the alternative products identified in all of the above described cases before selecting the desired alternative product or products for recommendation in the product summary. In this regard, any appropriate criterion can be utilized in selection of the identified candidate products from the plurality of identified candidate alternative products satisfying the criterion of the cases set forth and described above. For example, in one embodiment, the brand of the identified candidate alternative product may be used to determine which of the products identified in each of the above cases is to be selected for use in recommendation in the product summary. In particular, the information that is stored in the alternative products database 64 may include information regarding the brand/manufacturer of each of the candidate alternative product identified. One or more of the brands of the candidate alternative products may be flagged as being a premier brand for a particular product category. The alternative product selection module 60 may then select the alternative product identified that is from a premier brand for use in the recommendation theme. Of course, use of brands is only one example of how the alternative product selection module 60 can select the desired alternative product from the identified candidate products, and in other embodiments, other criteria or methodologies may be used.

Moreover, each of the above described cases preferably have corresponding assertions (with models, templates and snippets) that are utilized by the assertion model module 40. Thus, depending on which of the identified candidate alternative products is actually selected by the alternative product selection module 60, the summary generation module 50 utilizes corresponding assertions from the assertion model module 40 to provide a natural narrative that recommends the selected alternative product in the "Alternative Product Recommendation" theme of the generated product summary.

All of the foregoing considerations allow assertions for alternative product summaries to be modeled globally, i.e. without respect to which category of product is in question (e.g. vacuums, digital cameras or cars), so long as a basic vocabulary is resident in the product summary generator 10 by which to refer to the products in the particular product category. Generating an alternative product recommendation with an assertion for a camera that states "You can get a higher resolution for the same price in this CANON™ model", or for a car that states "You can get additional horsepower for a similar price in this MUSTANG™", are essentially the same assertion template being instantiated for two different categories. However, some specialized explanation assertions may be implemented to further enhance the value prospect of the recommended alternative product of a particular product category and the recommendation itself.

For example, the benefit of more horsepower in a car is quite different from the benefit of more resolution in a digital camera, despite the fact that both generally follow a "more is better" pattern. In the case of the car, an assertion template may be provided with a condition requiring that the template be triggered only where the comparative attribute of the preceding sentence is "horsepower". Following such a sentence, the next template may be implemented as follows:

> The additional <AddedHorsepower:unit> of the <CompProduct:manufacturer> <CompProduct:ModelName> will put you in a different class of vehicles, enabling you to claim that you have a real "muscle car."

The instantiated sentence using the above template may thus, read:

> The additional 45 horses of the FORD MUSTANG™ RS will put you in a different class of vehicles, enabling you to claim that you have a real "muscle car."

This type of follow-on sentence allows for domain-specific customization of the global structure of alternative product recommendations to a specific product category, and even to specific attribute-based benefits within the product category.

The APPENDIX attached hereto shows a small sampling of various naturally reading alternative product recommendations that have been generated using a product summary generator in accordance with one example implementation of the present invention. In particular, the rows of the APPENDIX list various models of handheld PCs and PDAs while the columns set forth possible alternative product recommendations for the corresponding models of handheld PCs or PDAs. Each of the possible alternative product recommendations is a result of the alternative product selection module 60 identifying a possible candidate product by applying the various example cases described in detail above. Thus, if the selected product for which the product summary is generated is HP™ IPAQ™ Pocket PC H3635 (the first handheld PC listed in the APPENDIX), various alternative product recommendations may be generated by the product summary generator that recommends, for example, PALM™ TUNGSTEN™ or SONY™ CLIE™ models. As shown, each potential alternative product recommendation briefly describes how these alternative products compare to the selected product. One or more of the possible alternative product recommendations may be ultimately selected for display in the "Alternative Product Recommendation" theme of the generated product summary. Of course, it should be understood that the alternative product recommendations set forth in the attached APPENDIX are provided as illustrative examples only, and the present invention may be applied in any other appropriate manner.

In accordance with another aspect of the present invention, the "Alternative Product Recommendation" theme discussed in detail above that is generated by the product summary generator 10 may actually be utilized as an advertisement in which the manufacturers of products pay fees or provide other compensation to the administrator of the product summary generator 10 for recommending their products. Thus, the described alternative product recommendation theme may be used to cross-sell a product where the alternative product recommended is a product from a different manufacturer than the selected product described in the product summary. Alternatively, the described alternative product recommendation theme may be used to up-sell a product where the alternative product recommended is a different, and more expensive, model from the same manufacturer.

In the above regard, only products from manufacturers that pay the advertisement fee may be stored in the alternative products database 64 for consideration for use in the alternative product recommendation theme of the generated product summary. In addition, the amount of the advertisement fees itself, may be used by the alternative product selection module 60 in the selection of one of the identified candidate alternative products for recommendation in the product summary. In particular, the amount of advertisement fee may be correlated to the frequency in which a particular alternative product is to be recommended in the Alternative Product Recommendation theme. Of course, other parameters may be utilized to control the frequency in which a particular alternative product is recommended. In other implementations, the fees can be paid upon an actual sales of the recommended product that is attributed to the product being recommended in the Alternative Product Recommendation theme, the attribution of the actual sales to the recommendation being implemented in any appropriate manner.

To the extent that competing product manufactures vie for having their own products recommended in the Alternative Product Recommendation theme, any appropriate method may be utilized to determine which product is actually recommended. In this regard, the competing product manufacturers may be allowed to bid against each other, like in an auction, for the right to be recommended in the Alternative Product Recommendation, the right to the recommendation being awarded to the highest bidding manufacturer.

In the above regard, in another embodiment, the manufacturer may bid to be the only manufacturer, or one of a few manufacturers, whose products are included in a limited sub-pool of alternative products which are eligible for selection for recommendation by the alternative product selection module 60. The best and most favorable alternative product in the sub-pool would then be selected for recommendation. If more than one manufacturer is represented with products in the limited sub-pool for the same category of products, an optional weighting factor based on the highest bid may be provided so that the products from the highest bidder may be selected. Of course, in such an implementation, the selection of the alternative product may be based on another business consideration, for example, if a revenue model other than bidding is utilized for payment.

Whereas various themes have been described in detail above, including the "Alternative Product Recommendation" theme, the editors that set up the product summary generator 10 may add any number of supplemental themes as well. For example, in the product category of digital cameras, editors may add "suggested uses" theme or "suggested accessories" theme, and so forth. Such supplemental themes would preferably be based on secondary attributes and implemented in a manner similar to that described above relative to the other themes. For example, suggested accessories may include a dedicated photo printer, but for low-resolution cameras, this would not be a recommended accessory since such cameras do not have sufficient resolution to make such printers worthwhile.

The compilation of assertions and their modification via merging and insertion of transitional phrases can leave the resulting "sentences" in an interim state where they lack correct punctuation and capitalization, etc. Routines may be called and utilized by the product summary generator 10 near the end of every generation sequence to clean up such formatting. Such routines are already known in the art and need not be described in further detail here. When each theme has been generated, the themes desired which may be predetermined or otherwise selected from the interface to the product summary generator 10 may be called up, labeled, and generated as a list of paragraphs.

Based on the interface of the product summary generator 10, the product summary that has been generated in the manner described above may be displayed and/or printed, etc. In one embodiment, the generated product summary may be a continuous body of text. In another embodiment, the themes of the generated product summary may be set forth in separate paragraphs as shown in the example product summary 120 of FIG. 2B. Alternatively, the interface of the product summary generator 10 may include a set of tabs, each tab labeled with one theme of the product summary. In still another alternative interface, a list of the themes may be provided with a cursor-over effect such that whichever label the person holds the cursor over, the appropriate theme is displayed in a shared display panel. Of course, the above noted interface designs are exemplary only and many alternatives may be implemented instead.

It should now be apparent how the present invention provides a product summary generator which generates product summaries that sound and read naturally so that it can be easily understood by the reader and information presented therein can be used to aid in purchasing decisions. In particular, it should now be evident how the product summary generator such as that shown in FIG. 1 may be utilized to automatically generate product summaries having a form such as that schematically shown in FIG. 2A from various inputs such as attribute values, attribute ranks, prices, scenario information, product category information, attribute importance rating, secondary attribute functions and rules, and assertion models. By providing the required information regarding a particular product of a product category (via a file or a database), the product summary generator can be used to automatically generate a product summary which reads naturally.

Figure 4:
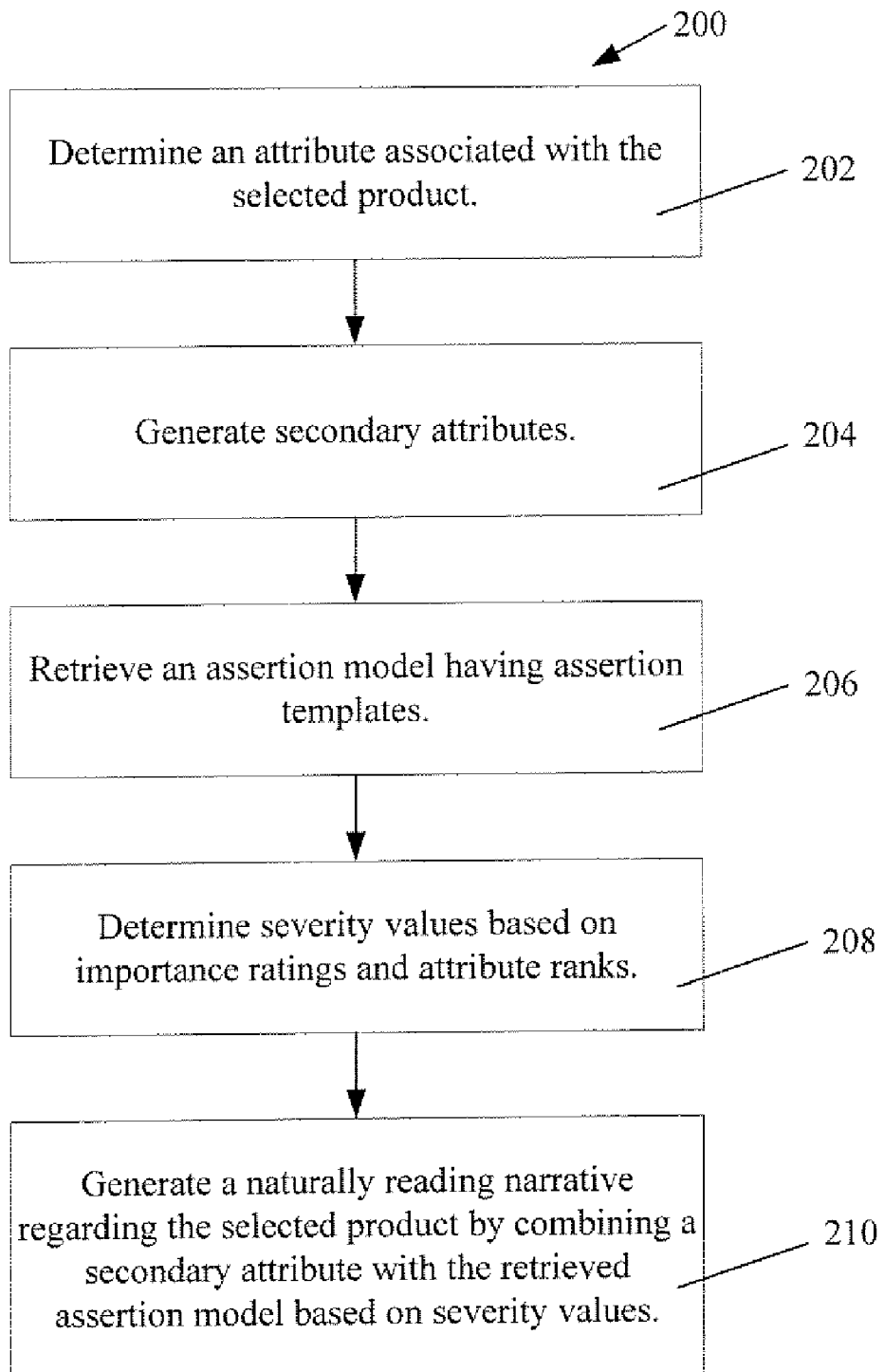
FIG. 4 is a flow diagram illustrating one example method in accordance with the present invention.

Furthermore, it should also be evident how the present invention provides a novel method of generating product summaries, an example method being schematically illustrated in the flow diagram 200 of FIG. 4. As shown, the method as shown in flow diagram 200 includes step 202 in which attribute(s) associated with the selected product is determined. In step 204, secondary attributes are determined, and assertion model having assertion templates is retrieved in step 206. Severity values are then determined in step 208 based on importance ratings and attribute ranks. In accordance with the illustrated method, a naturally reading narrative regarding the selected product is generated in step 210 by combining a second attribute with retrieved assertion model. In one embodiment, the generated product summary of step 210 would include an alternative product recommendation in which an alternative product is identified and a brief description thereof is provided for consideration by the consumer. The secondary attribute used may be based on the determined severity values of step 208.

Figure 5:
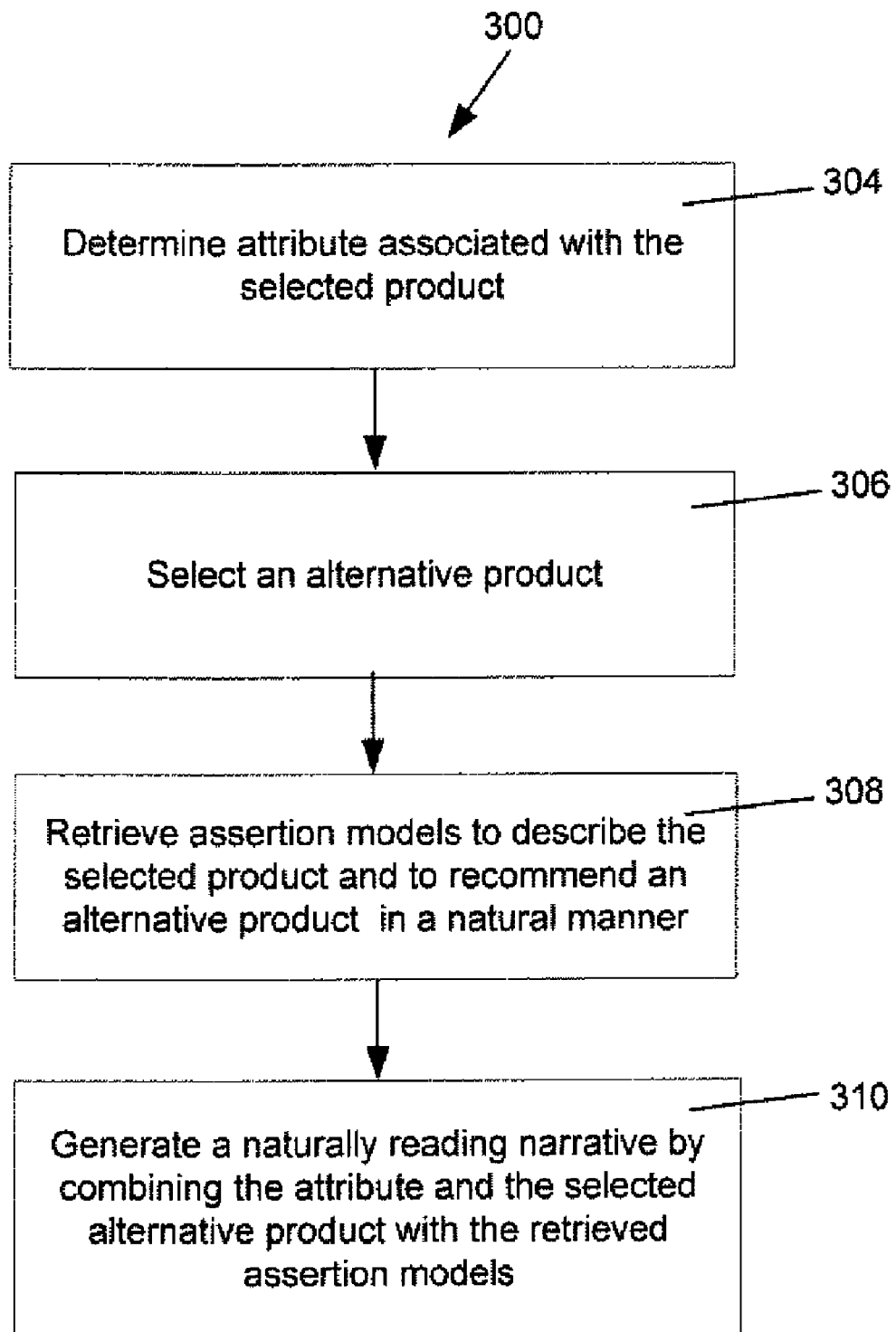
FIG. 5 is a flow diagram illustrating another example method in accordance with the present invention.

Moreover, it should also be evident how the present invention provides still another novel method of generating product summaries such as that schematically illustrated in the flow diagram 300 of FIG. 5. As shown, the method as shown in flow diagram 300 includes step 304 in which at least one attribute associated with the selected product is determined. As described, the attribute includes at least one of an attribute name, an attribute value, and an attribute unit. The method also includes step 306 in which an alternative product is identified. In step 308, assertion models are retrieved to describe the selected product, and to recommend an alternative product in a natural manner. Finally, the method includes step 310 in which a naturally reading narrative is generated by combining the attribute and the selected alternative product with the retrieved assertion models such that the generated narrative includes a recommendation of the selected alternative product.

Of course, it should also be noted that the above described flow diagrams are merely example methods of generating product summaries and the present invention should not be construed to be limited thereto. Various other methods for generating product summaries should be now evident in view of the teachings set forth above. Moreover, various other steps as described previously relative to the product summary generator 10 may be provided as well in other embodiments of the method. For example, the steps of assigning key attributes, calculating an average price of comparable products, and/or designating themes to the assertion models, etc. as described above relative to the product summary generator 10 may be provided as well.

While various embodiments in accordance with the present invention have been shown and described, it is understood that the invention is not limited thereto. The present invention may be changed, modified and further applied by those skilled in the art. Therefore, this invention is not limited to the detail shown and described previously, but also includes all such changes and modifications.

APPENDIX

| Product Name | AdBrier Themes | | | |
|---|---|---|---|---|
| HP iPaq Pocket PC H3650 | [CompBetterFeaturesForLess] [0.81] To help decide if the HP iPAQ H3650 is your best choice in a handheld, you may want to take a look at the Sony CLIE PEG-SJ22, as it will provide you some advantages at a lower price than the HP iPAQ H3650. For example, it has a 16-bit, 64,000-color display, which is richer than the HP iPAQ H3650 (12-bit, 4,000-color). Moreover, the Sony CLIE PEG-SJ22 usually goes for around $150, as opposed to $255 for the HP iPAQ H3650. | [CompCrossUpSell] [0.39] For a bit more money than the HP iPAQ H3650, you can get the Palm Tungsten T2 having its richer display (16-bit, 64,000-color, as opposed to 12-bit, 4,000-color). If you want to look at an interesting upgrade option, you could pay just a bit more and have the Palm Tungsten T2, which has a few additional benefits. For example, it has a 16-bit, 64,000-color display, compared to the 12-bit, 4,000-color of the HP iPAQ H3650. And it will only | [AltSameFeaturesAndPrice] [0.36] If you would like to consider a wireless enabled handheld with many similar features to the HP iPAQ H3650, and for around the same cost, then check out the Sony CLIE PEG-TJ37. It sells for around $275. Just like the HP model, the Sony has 32 MB memory. And it has a 320 × 320 screen resolution, which you can compare to the 240 × 320 of the HP model. The higher resolution will come in handy if you want to use your | [CompCrossUpSell] [0.27] For a little more money than the HP iPAQ H3650, you could buy the Sony CLIE PEG-N610C having its richer display (16-bit, 64,000-color, as opposed to 12-bit, 4,000-color). As an interesting upgrade option, you could pay just a bit more and have the Sony CLIE PEG-N610C, which has a few additional benefits. For example, it has a 16-bit, 64,000-color display, compared to the 12-bit, 4,000-color of the HP |

APPENDIX-continued

| Product Name | AdBrier Themes | | | |
|---|---|---|---|---|
| | | cost you about $40 more than the HP iPAQ H3650 (i.e., around $295). | handheld as a viewer for photos from a digital camera. | iPAQ H3650. And it will only cost you about $35 more than the HP iPAQ H3650 (i.e., around $290). |
| HP iPaq BlackBerry W1000 | [AltSameFeaturesAndPrice] [0.81] If you are interested in a multimedia handheld with many similar features to the HP iPAQ Blackberry W1000, and for around the same cost, then check out the Palm Tungsten E. It sells for around $190. Similar in many of its features, the Palm weighs just 4.6 ounces, which is similar to the 5 ounces of the HP model, and it also has a mere 0.5 inch thickness, which again is similar to the 0.9 inch of the HP model. The weight of a handheld is significant for those who will be holding it for lengthy periods of time and may be subject to hand and finger fatigue. | [AltSameFeaturesAndPrice] [0.54] The Sony CLIE PEG-TJ27 provides some similar features to the HP iPAQ Blackberry W1000, in a multimedia handheld. It goes for around $190. Similar in many of its features, the Sony weighs just 5.1 ounces, which is similar to the 5 ounces of the HP model, and it also has a mere 0.5 inch thickness, which again is similar to the 0.9 inch of the HP model. The weight of a handheld is significant for those who will be holding it for lengthy periods of time and may be subject to hand and finger fatigue. | [AltCrossUpSell] [0.37] If you're interested in something that is a little more feature-rich, you could get the Palm Zire 71, a multimedia handheld, which has certain advantages. For example, it has a 320 × 320 screen resolution, compared to the 132 × 65 of the HP iPAQ Blackberry W1000. The higher resolution will come in handy if you want to use your handheld as a viewer for photos from a digital camera. Additionally, the Palm Zire 71 has 16 MB memory, as opposed to 512 KB for the HP iPAQ Blackberry W1000. And at $225, it costs just $25 more than the HP iPAQ Blackberry W1000. | [AltCrossUpSell] [0.23] Before you decide to buy the HP iPAQ Blackberry W1000, you might want to compare it to the Sony CLIE PEG-TJ37, a wireless enabled handheld which has a few additional benefits. Although it will cost you about $75 more than the HP iPAQ Blackberry W1000, it will bring you into a different class of handhelds. For example, it has 32 MB memory, compared to the 512 KB of the HP iPAQ Blackberry W1000. Additionally, the Sony CLIE PEG-TJ37 has a 320 × 320 screen resolution, as opposed to 132 × 65 for the HP iPAQ Blackberry W1000. The higher resolution will come in handy if you want to use your handheld as a viewer for photos from a digital camera. |
| Palm Zire | [CompUpSell] [0.35] If you want to look at an interesting upgrade option, you could pay just a bit more and get the Palm Tungsten T, which has a few additional benefits. Although it will cost you about $225 more than the Palm Zire, it will bring you into a different class of handhelds. For instance, it has a 320 × 320 screen resolution, compared to the 160 × 160 of the Palm Zire. The higher resolution will come in handy if you want to use your handheld | [AltUpSell] [0.26] Before you decide to buy the Palm Zire, you might want to compare it to the Palm Tungsten E, a multimedia handheld which has certain advantages. Although it will cost you about $120 more than the Palm Zire, it will bring you into a different class of handhelds. For example, it has 32 MB memory, compared to the 2 MB of the Palm Zire. Additionally, | | |

APPENDIX-continued

| Product Name | AdBrier Themes | | | |
|---|---|---|---|---|
| | as a viewer for photos from a digital camera. Additionally, the Palm Tungsten T has 16 MB memory, as opposed to 2 MB memory for the Palm Zire. | the Palm Tungsten E has a 320 × 320 screen resolution, as opposed to 160 × 160 for the Palm Zire. The higher resolution will come in handy if you want to use your handheld as a viewer for photos from a digital camera. | | |
| Sony CLIE PEG-NX70V | [CompDownSell] [0.36] If you want to spend a little less money, you could get the Sony CLIE PEG-N760C. It has 8 MB memory, which you can compare to the 16 MB of the Sony CLIE PEG-NX70V. And it will cost you about $85 less than the Sony CLIE PEG-NX70V (i.e., around $370). | [AltDownSell] [0.15] Without spending as much money, you could get the Sony CLIE PEG-N610C. It has 8 MB memory, which you can compare to the 16 MB of the Sony CLIE PEG-NX70V, Also, its $290 street price is about $165 less than the Sony CLIE PEG-NX70V. | | |
| Palm Tungsten T Handheld | [CompUpSell] [0.46] As an interesting upgrade option, you could pay just a bit more and have the Palm Tungsten T3, which has certain advantages. Although it will cost you about $105 more than the Palm Tungsten T, it will bring you into a different class of handhelds. For example, it has 64 MB memory, compared to the 16 MB of the Palm Tungsten T. | [AltUpSell] [0.36] If you're interested in something that is a little more feature-rich, you could get the Palm Tungsten C, a wireless enabled handheld, which has a few additional benefits. For instance, it has 64 MB memory, compared to the 16 MB of the Palm Tungsten T. And at $355, it costs just $60 more than the Palm Tungsten T. | | |
| HP iPaq Pocket PC H3635 | [CompBetterFeatures ForLess] [0.84] To help decide if the HP iPAQ H3635 is your best choice in a handheld, you may want to take a look at the Sony CLIE PEG-SJ22, as it will give you certain additional benefits at a lower price than the HP iPAQ H3635. For example, it has a 16-bit, 64,000-color display, which is richer than the HP iPAQ H3635 (12-bit, 4,000-color). Moreover, the Sony CLIE PEG-SJ22 usually goes for | [CompBetterFeatures ForPrice] [0.57] For around the same price as the HP iPAQ H3635, you could get the Palm Tungsten 12 with its richer display (16-bit, 64,000-color, as opposed to 12-bit, 4,000-color). | [AltSameFeatures AndPrice] [0.33] If you would like to consider a multimedia handheld with many similar features to the HP iPAQ H3635, and for around the same cost, then check out the Palm Tungsten T2. It sells for around $295. Just like the HP model, the Palm has 32 MB memory. And it has a 320 × 320 screen resolution, which you can | [AltSameFeatures AndPrice] [0.31] The Sony CLIE PEG-TJ37 provides some similar features to the HP iPAQ H3635, in a wireless enabled handheld. It costs around $275. Just like the HP model, the Sony has 32 MB memory. And it has a 320 × 320 screen resolution, which you can compare to the 240 × 320 of the HP model. The higher resolution |

APPENDIX-continued

| Product Name | AdBrier Themes | | | |
|---|---|---|---|---|
| | about $150, compared to $300 for the HP iPAQ H3635. | | compare to the 240 × 320 of the HP model. The higher resolution will come in handy if you want to use your handheld as a viewer for photos from a digital camera. | will come in handy if you want to use your handheld as a viewer for photos from a digital camera. |
| HP iPaq Pocket PC H3765 | [CompBetterFeaturesForPrice] [0.57] Before purchasing the HP iPAQ H3765, you may want to consider the Palm Tungsten T3, which for around the same price has a 16-bit, 64,000-color display (i.e., richer than the 12-bit, 4,000-color of the HP iPAQ H3765). | [AltSameFeaturesAndPrice] [0.37] The Palm Tungsten C provides some similar features to the HP iPAQ H3765, in a wireless enabled handheld. It costs around $410. In many ways like the HP, the Palm has 64 MB memory and weighs just 6.3 ounces. | [AltCrossUpSell] [0.35] Before you decide to buy the HP iPAQ H3765, you might want to compare it to the Sony CLIE PEG-UX50, a multimedia handheld which has certain advantages. Although it will cost you about $130 more than the HP iPAQ H3765, it will bring you into a different class of handhelds. For example, it has a 16-bit, 64,000-color display, compared to the 12-bit, 4,000-color of the HP iPAQ H3765. | |
| Garmin iQue 3600 | [CompBetterPriceForFeatures] [0.9] It's possible for you to get some similar features to the Garmin iQue 3600, but at a lower price of around $190, in the Palm OS-based Palm Tungsten E. Just like the Garmin, the Palm has 32 MB memory and has a 16-bit, 64,000-color display. | [CompBetterPriceForFeatures] [0.62] It's possible for you to get some similar features to the Garmin iQue 3600, but at a lower price of around $190, in the Palm OS-based Sony CLIE PEG-TJ27. Just like the Garmin, the Sony has 32 MB memory and has a 16-bit, 64,000-color display. | | |
| Sony CLIE PEG-SJ33 | [CompUpSell] [0.56] For just a little more money, you could move up to the Sony CLIE PEG-TJ35, which has a few additional benefits. For instance, it has 32 MB memory, against the 16 MB of the Sony CLIE PEG-SJ33. And it will only cost you about $20 more than the Sony CLIE PEG-SJ33 (i.e., around $190). | [AltUpSell] [0.26] Before you decide to buy the Sony CLIE PEG-SJ33, you might want to compare it to the Sony CLIE PEG-TJ37, a wireless enabled handheld which has a few additional benefits. Although it will cost you about $105 more than the Sony CLIE PEG-SJ33, it will bring you into a different class of handhelds. For instance, it has 32 MB | | |

APPENDIX-continued

| Product Name | AdBrier Themes | |
|---|---|---|
| | | memory, against the 16 MB of the Sony CLIE PEG-SJ33. |
| Handspring Visor Platinum (Silver) | [CompUpSell] [0.32] If you want to look at an interesting upgrade option, you could pay just a bit more and have the Palm m130, which has a few additional benefits. Although it will cost you about $85 more than the Palm Handspring Visor Platinum, it will bring you into a different class of handhelds. For example, it has a 16-bit, 64,000-color display, against the 4-bit, 16 gray level of the Palm Handspring Visor Platinum. | [AltUpSell] [0.24] Before you decide to buy the Palm Handspring Visor Platinum, you might want to compare it to the Palm Tungsten E, a multimedia handheld which has certain advantages. Although it will cost you about $125 more than the Palm Handspring Visor Platinum, it will bring you into a different class of handhelds. For example, it has a 16-bit, 64,000-color display, against the 4-bit, 16 gray level of the Palm Handspring Visor Platinum. In addition, the Palm Tungsten E has 32 MB memory, as opposed to 8 MB for the Palm Handspring Visor Platinum. |
| Palm Zire 71 | [CompUpSell] [0.49] If you want to look at an interesting upgrade option, you could pay just a bit more and get the Palm Tungsten T2, which has certain advantages. Although it will cost you about $70 more than the Palm Zire 71, it will bring you into a different class of handhelds. For instance, it has 32 MB memory, against the 16 MB of the Palm Zire 71. | [AltUpSell] [0.33] Before you decide to buy the Palm Zire 71, you might want to compare it to the Palm Tungsten T2, a consumer-oriented handheld which has a few additional benefits. Although it will cost you about $70 more than the Palm Zire 71, it will bring you into a different class of handhelds. For example, it has 32 MB memory, against the 16 MB of the Palm Zire 71. |
| Palm Tungsten C | [AltDownSell] [0.5] If you want to spend a little less money, you could get many similar advantages in the Palm m515. It has 16 MB memory, which you can compare to the 64 MB of the Palm Tungsten C. It also has a 160 × 160 screen resolution, compated to | |

APPENDIX-continued

| Product Name | AdBrier Themes | | | |
|---|---|---|---|---|
| | 320 × 320. The higher resolution will come in handy if you want to use your handheld as a viewer for photos from a digital camera. Additionally, the Palm m515 has a 160 × 160 screen resolution, as opposed to 320 × 320 for the Palm Tungsten C.. The higher resolution will come in handy if you want to use your handheld as a viewer for photos from a digital camera. Also, its $315 street price is about $95 less than the Palm Tungsten C. | | | |
| Compaq iPaq H3630 | [AltSameFeaturesAndPrice] [0.67] If you would like to consider a multimedia handheld with many similar features to the HP Compaq iPAQ H3630, and for around the same cost, then check out the Palm Tungsten E. It sells for around $190. Just like the HP model, the Palm has 32 MB memory. And it has a 320 × 320 screen resolution, which you can compare to the 240 × 320 of the HP model. The higher resolution will come in handy if you want to use your handheld as a viewer for photos from a digital camera. | [CompBetterFeaturesForPrice] [0.55] There's an interesting alternative to the HP Compaq iPAQ H3630. Selling at around $195, the Sony CLIE PEG-SJ30 has a 16-bit, 64,000-color display, which is richer than that of the HP product (12-bit, 4,000-color). | [CompBetterFeaturesForLess] [0.48] In contrast to this HP model, you can enjoy certain advantages (while getting a lower price) in the Sony CLIE PEG-SJ22. First of all, it has a 16-bit, 64,000-color display, which is richer than the HP Compaq iPAQ H3630 (12-bit, 4,000-color). Moreover, the Sony CLIE PEG-SJ22 usually goes for about $150, compared to $195 for the HP Compaq iPAQ H3630. | [CompCrossUpSell] [0.31] For a bit more money than the HP Compaq iPAQ H3630, you can buy the Palm Tungsten T2 with its richer display (16-bit, 64,000-color, as opposed to 12-bit, 4,000-color). As an interesting upgrade option, you could pay just a bit more and get the Palm Tungsten T2, which has a few additional benefits. Although it will cost you about $100 more than the HP Compaq iPAQ H3630, it will bring you into a different class of handhelds. For example, it has a 16-bit, 64,000-color display, compared to the 12-bit, 4,000-color of the HP Compaq iPAQ H3630. |
| AlphaSmart Dana | [CompBetterFeaturesForPrice] [0.91] Before purchasing the Alphasmart Dana, you might want to take a look at the Palm Tungsten T3, which for around the same price has 64 MB memory (i.e., larger than the 8 MB of the Alphasmart Dana). The Palm model also has a mere 3 inch width, which is narrower | [AltSameFeaturesAndPrice] [0.47] If you are interested in a wireless enabled handheld with many similar features to the Alphasmart Dana, and for around the same cost, then check out the Sony CLIE PEG-TH55. It sells for around $380. | [AltCrossUpSell] [0.35] Before you decide to buy the Alphasmart Dana, you might want to compare it to the Sony CLIE PEG-NX70V, a multimedia handheld which has certain advantages. For example, it has a mere 2.8 inch width, compared | [AltSameFeaturesAndPrice] [0.23] If you would like to consider a consumer-oriented handheld with many similar features to the Alphasmart Dana, and for around the same cost, then check out the Palm Tungsten T3. It sells for around |

APPENDIX-continued

| Product Name | AdBrier Themes | | |
|---|---|---|---|
| | than that of the Alphasmart Dana (12.4 inch). The size of the device can be a significant factor, for example, if you intend to carry the device in your shirt pocket or pants pocket | to the 12.4 inch of the Alphasmart Dana. The size of the device can be a significant factor, for example, if you intend to carry the device in your shirt pocket or pants pocket. In addition, the Sony CLIE PEG-NX70V weighs just 8 ounces, as opposed to 2 lbs for the Alphasmart Dana. The weight of a handheld is significant for those who will be holding it for lengthy periods of time and may be subject to hand and finger fatigue. Also its $455 street price is only $75 more than the Alphasmart Dana | $400. |
| Sony CLIE PEG-TG50 | [CompUpSell] [0.4] If you want to look at an interesting upgrade option, you could pay just a bit more and have the Sony CLIE PEG-NX80V, which has certain advantages. Although it will cost you about $140 more than the Sony CLIE PEG-TG50, it will bring you into a different class of handhelds. For example, it has 32 MB memory, compared to the 16 MB of the Sony CLIE PEG-TG50. | [AltUpSell] [0.31] Before you decide to buy the Sony CLIE PEG-TG50, you might want to compare it to the Sony CLIE PEG-TH55, a wireless enabled handheld which has certain advantages. Although it will cost you about $100 more than the Sony CLIE PEG-TG50, it will bring you into a different class of handhelds. For example, it has 32 MB memory, compared to the 16 MB of the Sony CLIE PEG-TG50. | |
| Asus MyPal A716 | [CompBetterPriceFor Features] [0.55] You could get some similar features to the Asus Mypal A716, but at a lower price of around $355, in the Palm OS-based Palm Tungsten C. | [CompSameFeatures AndPrice] [0.22] As an additional alternative, you can get some similar features to the Asus Mypal A716, and at a comparable price of around $410, in the Palm OS-based Palm Tungsten C. | |

APPENDIX-continued

| Product Name | | AdBrier Themes |
|---|---|---|
| VISOR EDGE BLUE 8 MB USB W/ STOWAWAY PORTABLE KEYBOARD-KIT | [CompUpSell] [0.38] If you want to look at an interesting upgrade option, you could pay just a bit more and have the Palm m130, which has certain advantages. Although it will cost you about $70 more than the Palm Visor Edge Blue 8 MB, it will bring you into a different class of handhelds. For instance, it has a 16-bit, 64,000-color display, compared to the 4-bit, 16 gray level of the Palm Visor Edge Blue 8 MB. | [AltUpSell] [0.28] Before you decide to buy the Palm Visor Edge Blue 8 MB, you might want to compare it to the Palm Tungsten E, a multimedia handheld which has a few additional benefits. Although it will cost you about $110 more than the Palm Visor Edge Blue 8 MB, it will bring you into a different class of handhelds. For example, it has a 16-bit, 64,000-color display, compared to the 4-bit, 16 gray level of the Palm Visor Edge Blue 8 MB. In addition, the Palm Tungsten E has 32 MB memory, as opposed to 8 MB for the Palm Visor Edge Blue 8 MB. |
| Palm Tungsten T2 Handheld | [CompDownSell] [0.39] If you want to spend a little less money, you could get the Palm Zire 71. It has 16 MB memory, which you can compare to the 32 MB of the Palm Tungsten T2. And at $250, you'll pay $45 less than you would for the Palm Tungsten T2. | [AltDownSell] [0.29] Without spending as much money, you could get many similar advantages in the Palm Handspring Visor Prism. It has 8 MB memory, which you can compare to the 32 MB of the Palm Tungsten T2. It also has a 160 × 160 screen resolution, competed to 320 × 320. The higher resolution will come in handy if you want to use your handheld as a viewer for photos from a digital camera. In addition, the Palm Handspring Visor Prism has a 160 × 160 screen resolution, as opposed to 320 × 320 for the Palm Tungsten T2. The higher resolution will come in handy if you want to use your handheld as a viewer for photos from a digital camera. Also, its $170 street price is |

APPENDIX-continued

| Product Name | AdBrier Themes | | |
|---|---|---|---|
| | | about $125 less than the Palm Tungsten T2. | |
| Sony CLIE PEG-UX50 | [CompDownSell] [0.39] If you want to spend a little less money, you could get many similar advantages in the Sony CLIE PEG-NR70. It has 16 MB memory, which you can compare to the 40 MB of the Sony CLIE PEG-UX50. And it will cost you about $90 less than the Sony CLIE PEG-UX50 (i.e., around $465). | [AltDownSell] [0.15] If you want to spend a little less money, you could get many similar advantages in the Sony CLIE PEG-T615CS. It has 16 MB memory, which you can compare to the 40 MB of the Sony CLIE PEG-UX50. And at $320, it costs about $235 less than the Sony CLIE PEG-UX50. | |
| Sharp YO-P20 Personal Organizer | [CompCrossUpSell] [0.21] For a little more money than the Sharp YO-P20, you could buy the Palm Tungsten T2 having its larger memory (32 MB, as opposed to 768 KB). As an interesting upgrade option, you could pay just a bit more and get the Palm Tungsten T2, which has certain advantages. Although it will cost you about $275 more than the Sharp YO-P20, it will bring you into a different class of handhelds. For instance, it has 32 MB memory, compared to the 768 KB of the Sharp YO-P20. | [AltCrossUpSell] [0.07] Before you decide to buy the Sharp YO-P20, you might want to compare it to the Palm Tungsten E, a multimedia handheld which has a few additional benefits. Although it will cost you about $170 more than the Sharp YO-P20 it will bring you into a different class of handhelds. For instance, it has 32 MB memory, against the 768 KB of the Sharp YO-P20. | [AltCrossUpSell] [0.06] Before you decide to buy the Sharp YO-P20, you might want to compare it to the Sony CLIE PEG-TJ27, a multimedia handheld which has a few additional benefits, Although it will cost you about $170 more than the Sharp YO-P20, it will bring you into a different class of handhelds. For example, it has 32 MB memory, compared to the 768 KB of the Sharp YO-P20. |
| Toshiba 2032SP | [CompSameFeaturesAndPrice] [0.68] Note that for a comparable price of about $375, the Palm OS-based Palm Tungsten T3 would give you similar features to the Sprint Toshiba 2032SP. Just like the Sprint model, the Palm has a 16-bit, 64,000-color display. And note that it weighs just 5.5 ounces, which is more or less the same as the 7 ounces of the Sprint model. | [AltSameFeaturesAndPrice] [0.38] If you are interested in a wireless enabled handheld with many similar features to the Sprint Toshiba 2032SP, and for around the same cost, then check out the Palm Tungsten C. It sells for around $355. Just like the Sprint model, the Palm has a 16-bit, 64,000-color display. And it weighs just 6.3 ounces, which you can compare to the 7 ounces of the Sprint model. The weight of a handheld is significant for those who will be holding it for | [AltSameFeaturesAndPrice] [0.15] The Sony CLIE PEG-TH55 provides some similar features to the Sprint Toshiba 2032SP, in a wireless enabled handheld. It costs around $380. Just like the Sprint, the Sony has 32 MB memory and has a 16-bit, 64,000-color display. |

APPENDIX-continued

| Product Name | | AdBrier Themes | | |
|---|---|---|---|---|
| | | lengthy periods of time and may be subject to hand and finger fatigue. | | |
| Handspring Treo 300 | [CompBetterFeaturesForPrice] [0.82] There's a rather tempting alternative to the Sprint Handspring Treo 300. Selling at around $375, the Palm Tungsten T3 has 64 MB memory, which is larger than that of the Sprint product (16 MB). The Palm model also has a 16-bit, 64,000-color display, which is richer than that of the Sprint Handspring Treo 300 (12-bit, 4,000-color). | [AltSameFeaturesAndPrice] [0.59] If you are interested in a wireless enabled handheld with many similar features to the Sprint Handspring Treo 300, and for around the same cost, then check out the Palm Tungsten C. It sells for around $355. Similar in many of its features, the Palm weighs just 6.3 ounces, which is similar to the 5.7 ounces of the Sprint model, and it also has a mere 0.7 inch thickness, which again is similar to the 0.8 inch of the Sprint model. The weight of a handheld is significant for those who will be holding it for lengthy periods of time and may be subject to hand and finger fatigue. | [AltSameFeaturesAndPrice] [0.5] The Sony CLIE PEG-TH55 offers some similar features to the Sprint Handspring Treo 300, in a wireless enabled handheld. It has a street price of around $380. Similar in many of its features, the Sony weighs just 6.5 ounces, which is similar to the 5.7 ounces of the Sprint model, and it also has a mere 0.6 inch thickness, which again is similar to the 0.8 inch of the Sprint model. The weight of a handheld is significant for those who will be holding it for lengthy periods of time and may be subject to hand and finger fatigue. | [AltCrossUpSell] [0.26] If you're interested in something that is a little more feature-rich, you could get the Sony CLIE PEG-NR70, a multimedia handheld, which has certain advantages. For example, it has a 16-bit, 64,000-color display, against the 12-bit, 4,000-color of the Sprint Handspring Treo 300. Also, its $465 street price is only $75 more than the Sprint Handspring Treo 300. |
| Casio Cassiopeia EM-500 (Blue) | [CompBetterPriceForFeatures] [0.94] For a lower price of around $135, the Palm OS-based Sony CLIE PEG-SJ20 would give you similar features to the Casio Cassiopeia EM-500. Just like the Casio model, the Sony has 16 MB memory. And note that it has a 320 × 320 screen resolution, which is fairly comparable to the 240 × 320 of the Casio model. | [CompBetterPriceForFeatures] [0.55] You could get some similar features to the Casio Cassiopeia EM-500, but at a lower price of around $295, in the Palm OS-based Palm Tungsten T. Just like the Casio, the Palm has 16 MB memory and has a 16-bit, 64,000-color display. | [CompBetterFeaturesForLess] [0.52] In contrast to this Casio model, you can enjoy certain advantages (while getting a lower price) in the Palm Tungsten T3. To begin with, it has 64 MB memory, which is larger than the Casio Cassiopeia EM-500 (16 MB). Moreover, the Palm Tungsten T3 typically costs around $400, as opposed to $500 for the Casio Cassiopeia EM-500. | |
| Casio Cassiopeia EM-500 (Green) | [CompBetterPriceForFeatures] [0.94] For a lower price of around $135, the Palm OS-based Sony CLIE PEG-SJ20 would give you similar features to the Casio Cassiopeia EM-500. Just like the Casio model, the Sony has 16 MB memory. And note that it has a | [CompBetterFeaturesForLess] [0.57] To help decide if the Casio Cassiopeia EM-500 is your best choice in a handheld, you might want to take a look at the Palm Tungsten T3, which will provide you certain | [CompBetterPriceForFeatures] [0.55] You could get some similar features to the Casio Cassiopeia EM-500, but at a lower price of around $295, in the Palm OS-based Palm Tungsten T. Just like the Casio, | |

APPENDIX-continued

| Product Name | | AdBrier Themes | |
|---|---|---|---|
| | 320 × 320 screen resolution, which is fairly comparable to the 240 × 320 of the Casio model. | additional benefits at a lower price than the Casio Cassiopeia EM-500. For example, it has 64 MB memory, which is larger than the Casio Cassiopeia EM-500 (16 MB). Furthermore, the Palm Tungsten T3 usually goes for about $400, compared to $500 for the Casio Cassiopeia EM-500. | the Palm has 16 MB memory and has a 16-bit, 64,000-color display. |
| Casio Cassiopeia EM-500 (Red) | [CompBetterPriceForFeatures] [0.96] It's possible for you to get some similar features to the Casio Cassiopeia EM-500, but at a lower price of around $135, in the Palm OS-based Sony CLIE PEG-SJ20. Just like the Casio model, the Sony has 16 MB memory. And note that it has a 320 × 320 screen resolution, which is fairly comparable to the 240 × 320 of the Casio model. | [CompBetterFeaturesForLess] [0.57] To help decide if the Casio Cassiopeia EM-500 is your best choice in a handheld, you may want to take a look at the Palm Tungsten T3, which will give you certain additional benefits at a lower price than the Casio Cassiopeia EM-500. For example, it has 64 MB memory, which is larger than the Casio Cassiopeia EM-500 (16 MB). Moreover, the Palm Tungsten T3 usually goes for about $400, compared to $500 for the Casio Cassiopeia EM-500. | [CompBetterPriceForFeatures] [0.54] For a lower price of around $295, the Palm OS-based Palm Tungsten T would give you similar features to the Casio Cassiopeia EM-500. Just like the Casio, the Palm has 16 MB memory and has a 16-bit, 64,000-color display. |
| Casio Cassiopeia EM-500 (Sky Blue) | [CompBetterPriceForFeatures] [0.94] For a lower price of around $135, the Palm OS-based Sony CLIE PEG-SJ20 would give you similar features to the Casio Cassiopeia EM-500. Just like the Casio model, the Sony has 16 MB memory. And note that it has a 320 × 320 screen resolution, which is fairly comparable to the 240 × 320 of the Casio model. | [CompBetterPriceForFeatures] [0.54] For a lower price of around $295, the Palm OS-based Palm Tungsten T would give you similar features to the Casio Cassiopeia EM-500. Just like the Casio, the Palm has 16 MB memory and has a 16-bit, 64,000-color display. | [CompBetterFeaturesForLess] [0.51] In contrast to this Casio model, you can gain certain advantages (while getting a lower price) in the Palm Tungsten T3. For starters, it has 64 MB memory, which is larger than the Casio Cassiopeia EM-500 (16 MB). Moreover, the Palm Tungsten T3 typically costs around $400, compared to $500 for the Casio Cassiopeia EM-500. |

APPENDIX-continued

| Product Name | AdBrier Themes | | | |
|---|---|---|---|---|
| Casio Cassiopeia EM-500 (Yellow) | [CompBetterPriceForFeatures] [0.95] You could get some similar features to the Casio Cassiopeia EM-500, but at a lower price of around $135, in the Palm OS-based Sony CLIE PEG-SJ20. Just like the Casio model, the Sony has 16 MB memory. And note that it has a 320 × 320 screen resolution, which is fairly comparable to the 240 × 320 of the Casio model. | [CompBetterPriceForFeatures] [0.54] For a lower price of around $295, the Palm OS-based Palm Tungsten T would give you similar features to the Casio Cassiopeia EM-500. Just like the Casio, the Palm has 16 MB memory and has a 16-bit, 64,000-color display. | [CompBetterFeaturesForLess] [0.52] In contrast to this Casio model, you can enjoy certain advantages (while getting a lower price) in the Palm Tungsten T3. To begin with, it has 64 MB memory, which is larger than the Casio Cassiopeia EM-500 (16 MB). Moreover, the Palm Tungsten T3 typically costs about $400. compared to $500 for the Casio Cassiopeia EM-500. | |
| HP Palmtop PC 320 LX | [CompBetterFeaturesForLess] [1.07] To help decide if the HP Palmtop PC 320 is your best choice in a handheld, you may want to check out the Palm Zire, which will give you some advantages at a lower price than the HP Palmtop PC 320. For example, it weighs just 3.8 ounces, which is relatively lighter than the HP Palmtop PC 320 (15.6 ounces). The weight of a handheld is significant for those who will be holding it for lengthy periods of time and may be subject to hand and finger fatigue. The Palm Zire also has a mere 2.9 inch width, which is narrower than the HP Palmtop PC 320 (7.2 inch). The size of the device can be a significant factor, for example, if you intend to carry the device in your shirt pocket or pants pocket. Moreover, the Palm Zire typically costs around $70, compared to $470 for the HP Palmtop PC 320. | [CompBetterFeaturesForLess] [0.66] To help decide if the HP Palmtop PC 320 is your best choice in a handheld, you might want to take a look at the Sony CLIE PEG-S360, as it will provide you certain additional benefits at a lower price than the HP Palmtop PC 320. For example, it weighs just 4.2 ounces, which is relatively lighter than the HP Palmtop PC 320 (15.6 ounces). The weight of a handheld is significant for those who will be holding it for lengthy periods of time and may be subject to hand and finger fatigue. The Sony CLIE PEG-S360 furthermore has a mere 2.9 inch width, which is narrower than the HP Palmtop PC 320 (7.2 inch). The size of the device can be a significant factor, for example, if you intend to carry the device in your shirt pocket or pants pocket. Moreover, | [AltSameFeaturesAndPrice] [0.45] If you are interested in a multimedia handheld with many similar features to the HP Palmtop PC 320, and for around the same cost, then check out the Sony CLIE PEG-UX40. It sells for around $470. Similar in many of its features, the Sony has a 480 × 320 screen resolution, which is similar to the 640 × 240 of the HP model, and it also is just 3.5 inches in length, which again is similar to the 3.7 inches of the HP model. The higher resolution will come in handy if you want to use your handheld as a viewer for photos from a digital camera. | [AltCrossUpSell] [0.25] Before you decide to buy the HP Palmtop PC 320, you might want to compare it to the Sony CLIE PEG-UX50, a multimedia handheld which has certain advantages. For example, it has 40 MB memory, against the 4 MB of the HP Palmtop PC 320. In addition, the Sony CLIE PEG-UX50 weighs just 6.2 ounces, as opposed to 15.6 ounces for the HP Palmtop PC 320. The weight of a handheld is significant for those who will be holding it for lengthy periods of time and may be subject to hand and finger fatigue. Also, its $555 street price is only $85 more than the HP Palmtop PC 320. |

APPENDIX-continued

| Product Name | AdBrier Themes |
|---|---|
| | the Sony CLIE PEG-S360 typically costs around $180, as opposed to $470 for the HP Palmtop PC 320. |

We claim:

1. A computer-implemented method implemented by one or more computing devices for automatically generating a naturally reading narrative product summary including assertions about a specific product selected by a user, said method comprising:
determining, by at least one of the one or more computing devices, at least one attribute associated with said specific product, said at least one attribute including at least one of an attribute name, an attribute value, and an attribute unit;
selecting, by at least one of the one or more computing devices, an alternative product based on said at least one attribute; and
generating, by at least one of the one or more computing devices, a naturally reading narrative including assertions about the specific product and a recommendation of the alternative product.

2. The method of claim 1, wherein said alternative product has a price that is at least as high as price of said specific product.

3. The method of claim 1, wherein a manufacturer of said alternative product is the same as the manufacturer of said specific product.

4. The method of claim 1, wherein a manufacturer of said alternative product is different than a manufacturer of said specific product.

5. The method of claim 1, wherein said narrative includes at least one sentence recommending said alternative product.

6. The method of claim 1, wherein said recommendation is an advertisement, and further including the step of receiving compensation in exchange for recommending said alternative product.

7. The method of claim 6, wherein an amount of said compensation is based on at least one of frequency of said recommendation and number of recommended products sold that is attributable to said recommendation.

8. The method of claim 1, wherein the naturally reading narrative is generating using assertion models that comprise a plurality of assertion templates, each assertion template including a natural sentence pattern and at least one field corresponding to said at least one attribute.

9. The method of claim 1, wherein said at least one attribute is a plurality of attributes associated with said specific product and said alternative product, said method further comprising assigning importance ratings to each of said plurality of attributes.

10. The method of claim 1, further comprising designating at least one of said plurality of attributes as a key attribute, and wherein said generated naturally reading narrative is regarding said key attribute.

11. The method of claim 9, further comprising determining attribute ranks for each of said plurality of attributes, and processing said attribute ranks together with said importance ratings to derive a severity value for each of said plurality of attributes.

12. The method of claim 11, wherein said deriving said severity values includes applying an inflection algorithm.

13. The method of claim 11, wherein said selecting said alternative product includes identification of a plurality of alternative products from a plurality of candidate alternative products.

14. The method of claim 13, further comprising determining a severity differential between each of said plurality of attributes for said plurality of candidate alternative products and said specific product.

15. The method of claim 14, wherein said alternative product is selected based on at least one of a predetermined near-price margin, a predetermined near-rank margin, and a predetermined severity differential threshold.

16. The method of claim 15, wherein said selecting said alternative product includes identifying a candidate alternative product which: is within a predetermined near-price margin of said selected product; has at least one attribute with a severity value that is above a predetermined severity differential threshold; and has the same primary scenario as said selected product.

17. The method of claim 15, wherein said selecting said alternative product includes identifying a candidate alternative product which: is within a predetermined near-rank margin for said key attribute and for all attributes of said specific product that are above a predetermined high severity threshold; is priced lower and outside a predetermined near-price margin; and has the same primary scenario as said selected product.

18. The method of claim 15, wherein said selecting said alternative product includes identifying a candidate alternative product which: has at least one attribute with a severity value that is above a predetermined severity differential threshold; is priced lower and outside a predetermined near-price margin; and has the same primary scenario as said specific product.

19. The method of claim 15, wherein said selecting said alternative product includes identifying a candidate alternative product which: is within a predetermined near-price margin; is within a predetermined near-rank margin for said key attribute and for all attributes of said specific product that are above a predetermined high severity threshold; and has the same primary scenario as said specific product.

20. The method of claim 15, wherein selecting said alternative product includes identifying a candidate alternative product which: is within a predetermined near-price margin; is within a predetermined near-rank margin for said key attribute and for all attributes of said specific product that are above a predetermined high severity threshold; and has a different primary scenario than said specific product.

21. The method of claim 15, wherein said selecting said alternative product includes identifying a candidate alternative product which: is priced higher and outside a predetermined near-price margin; has at least one attribute with a severity value that is above a predetermined severity differential threshold; is from the same manufacturer as said specific product; and has the same primary scenario as said selected product.

22. The method of claim 15, wherein said selecting said alternative product includes identifying a candidate alternative product which: is priced higher and outside a predetermined near-price margin; has at least one attribute with a severity value that is above a predetermined severity differential threshold; is from the same manufacturer as said specific product; and has the same primary scenario as said specific product.

23. The method of claim 15, wherein said selecting said alternative product includes identifying a candidate alternative product which: is priced higher than said specific product; is within a predetermined near-rank margin for said key attribute; and is from a different manufacturer as said specific product.

24. The method of claim 15, wherein said selecting said alternative product includes identifying a candidate alternative product which: is priced lower than said specific product; is within a predetermined near-rank margin for said key attribute; and is from the same manufacturer as said specific product.

25. A product summary generator for automatically generating a naturally reading narrative product summary including assertions about a specific product selected by a user, said product summary generator comprising:
a processor coupled to a memory device configured to execute:
a product attribute module adapted to determine at least one attribute associated with said specific product, said attribute including at least one of an attribute name, an attribute value, and an attribute unit;
an alternative product selection module adapted to select an alternative product based on said at least one attribute; and
a summary generation module adapted to generate a naturally reading narrative by combining said at least one attribute and said alternative product with one or more retrieved assertion models so that said narrative includes a recommendation of said alternative product.

26. The product summary generator of claim 25, wherein said alternative product has a price that is at least as high as a price of said specific product.

27. The product summary generator of claim 25, wherein a manufacturer of said alternative product is the same as the manufacturer of said specific product.

28. The product summary generator of claim 25, wherein a manufacturer of said alternative product is different than a manufacturer of said specific product.

29. The product summary generator of claim 25, wherein said narrative includes at least one sentence recommending said alternative product.

30. The product summary generator of claim 25, wherein said recommendation is an advertisement whereby compensation is provided for recommending said alternative product.

31. The product summary generator of claim 30, wherein an amount of said compensation is based on at least one of frequency of said recommendation and number of recommended products sold that is attributable to said recommendation.

32. The product summary generator of claim 25, wherein said at least one attribute is a plurality of attributes associated with said specific product and said alternative product, said product attribute module assigns importance ratings to each of said plurality of attributes.

33. The product summary generator of claim 25, further comprising an assertion model module adapted to retrieve said one or more assertion models, wherein said one or more section models define forms in which an assertion can be used to generate the naturally reading narrative.

34. The product summary generator of claim 33, wherein said assertion models comprise a plurality of assertion templates, each assertion template including a natural sentence pattern and at least one field corresponding to said at least one attribute.

35. The product summary generator of claim 33, wherein said product attribute module designates at least one of said plurality of attributes as a key attribute, and wherein said generated naturally reading narrative is regarding said key attribute.

36. The product summary generator of claim 33, wherein said product attribute module determines attribute ranks for each of said plurality of attributes, and processes said attribute ranks together with said importance ratings to derive a severity value for each of said plurality of attributes.

37. The product summary generator of claim 36, wherein said product attribute module derives said severity values using an inflection algorithm.

38. The product summary generator of claim 36, further comprising an alternative products database for storing a plurality of candidate alternative products, wherein said alternative product selection module selects said alternative product from said alternative products database.

39. The product summary generator of claim 38, wherein said alternative product selection module determines a severity differential between each of said plurality of attributes for said plurality of candidate alternative products and said specific product.

40. The product summary generator of claim 39, wherein said alternative product is selected by said alternative product selection module based on at least one of a predetermined near-price margin, a predetermined near-rank margin, and a predetermined severity differential threshold.

41. The product summary generator of claim 40, wherein said alternative product is selected by said alternative product selection module by identifying a candidate alternative product in said alternative products database which: is within a predetermined near-price margin of said specific product; has at least one attribute with a severity value that is above a predetermined severity differential threshold; and has the same primary scenario as said specific product.

42. The product summary generator of claim 40, wherein said alternative product is selected by said alternative product selection module by identifying a candidate alternative product in said alternative products database which: is within a predetermined near-rank margin for said key attribute and for all attributes of said specific product that are above a predetermined high severity threshold; is priced lower and outside a predetermined near-price margin; and has the same primary scenario as said specific product.

43. The product summary generator of claim 40, wherein said alternative product is selected by said alternative product selection module by identifying a candidate alternative product in said alternative products database which: has at least one attribute with a severity value that is above a predetermined severity differential threshold; is priced lower and outside a predetermined near-price margin; and has the same primary scenario as said specific product.

44. The product summary generator of claim 40, wherein said alternative product is selected by said alternative product selection module by identifying a candidate alternative product in said alternative products database which: is within a predetermined near-price margin; is within a predetermined near-rank margin for said key attribute and for all attributes of said specific product that are above a predetermined high severity threshold; and has the same primary scenario as said specific product.

45. The product summary generator of claim 40, wherein said alternative product is selected by said alternative product selection module by identifying a candidate alternative product in said alternative products database which: is within a predetermined near-price margin; is within a predetermined near-rank margin for said key attribute and for all attributes of said specific product that are above a predetermined high severity threshold; and has a different primary scenario than said specific product.

46. The product summary generator of claim 40, wherein said alternative product is selected by said alternative product selection module by identifying a candidate alternative product in said alternative products database which: is priced higher and outside a predetermined near-price margin; has at least one attribute with a severity value that is above a predetermined severity differential threshold; is from the same manufacturer as said specific product; and has the same primary scenario as said specific product.

47. The product summary generator of claim 40, wherein said alternative product is selected by said alternative product selection module by identifying a candidate alternative product in said alternative products database which: is priced higher and outside a predetermined near-price margin; has at least one attribute with a severity value that is above a predetermined severity differential threshold; is from the same manufacturer as said specific product; arid has the same primary scenario as said specific product.

48. The product summary generator of claim 40, wherein said alternative product is selected by said alternative product selection module by identifying a candidate alternative product which: is priced higher than said specific product; is within a predetermined near-rank margin for said key attribute; and is from a different manufacturer as said specific product.

49. The product summary generator of claim 40, wherein said alternative product is selected by said alternative product selection module by identifying a candidate alternative product which: is priced lower than said specific product; is within a predetermined near-rank margin for said key attribute; and is from the same manufacturer as said specific product.

50. A computer-implemented method implemented by one or more computing devices for automatically generating a naturally reading narrative product summary including assertions about a specific product selected by a user, said method comprising:
    receiving, by at least one of the one or more computing devices, the selection of a first product from the user, the first product associated with a plurality of attributes;
    identifying, by at least one of the one or more computing devices, at least one attribute of the plurality of attributes for the first product;
    selecting, by at least one of the one or more computing devices, a second product based on the at least one attribute, the second product being the product having the high value rating for the at least one attribute; and
    generating, by at least one of the one or more computing devices, the naturally reading narrative product summary including assertions about the first product and a recommendation of the second product.

51. The method of claim 50, wherein the second product is a comparable product.

52. The method of claim 50, wherein the second product is an alternative product.

\* \* \* \* \*